US008196095B2

(12) United States Patent
Gupta et al.

(10) Patent No.: US 8,196,095 B2
(45) Date of Patent: Jun. 5, 2012

(54) MOBILE MARKETING APPLICATION

(75) Inventors: Arvind Gupta, San Carlos, CA (US); Ashutosh Tiwari, Studio City, CA (US); Gopalakrishnan Venkatraman, Campbell, CA (US); Dominic Cheung, South Pasadena, CA (US); Stacy R. Bennett, Pasadena, CA (US); Douglas B. Koen, Austin, TX (US)

(73) Assignee: Yahoo! Inc., Sunnyvale, CA (US)

( * ) Notice: Subject to any disclaimer, the term of this patent is extended or adjusted under 35 U.S.C. 154(b) by 1157 days.

(21) Appl. No.: 12/026,515

(22) Filed: Feb. 5, 2008

(65) Prior Publication Data

US 2009/0197580 A1 Aug. 6, 2009

(51) Int. Cl.
*G06F 9/44* (2006.01)
(52) U.S. Cl. ....................................................... 717/109
(58) Field of Classification Search .................. None
See application file for complete search history.

(56) References Cited

U.S. PATENT DOCUMENTS

| 6,009,409 | A | 12/1999 | Adler et al. | 705/14 |
| 6,026,368 | A | 2/2000 | Brown et al. | 705/14 |
| 6,199,045 | B1 | 3/2001 | Giniger et al. | 705/1 |
| 6,343,317 | B1 | 1/2002 | Glorikian | 709/217 |
| 6,377,793 | B1 | 4/2002 | Jenkins | 455/456 |
| 6,401,075 | B1 | 6/2002 | Mason et al. | 705/14 |
| 6,480,713 | B2 | 11/2002 | Jenkins | 455/456 |
| 6,654,725 | B1 | 11/2003 | Langheinrich et al. | 705/14 |
| 6,681,107 | B2 | 1/2004 | Jenkins et al. | 455/412.1 |
| 6,714,975 | B1 | 3/2004 | Aggarwal et al. | 709/224 |
| 6,822,663 | B2 | 11/2004 | Wang et al. | |
| 6,826,572 | B2 | 11/2004 | Colace et al. | 707/10 |
| 6,907,566 | B1 | 6/2005 | McElfresh et al. | 715/517 |

(Continued)

FOREIGN PATENT DOCUMENTS

| JP | 2002-366842 A | 12/2002 |
| KR | 10-2001-0094912 A | 11/2001 |
| KR | 10-2003-0088251 A | 11/2003 |

OTHER PUBLICATIONS

"CTIA: Smaato Introduces New Mobile Ad Solutions for Carriers: Advertising Delivery Support for Java Phones, Smartphones & Mobile Web; Launch of New Version of SOMA Mobile Advertising Platform," CTIA—San Francisco Moscone Center, Booth # 108, Oct. 23-25, 2007, 2 pages. Retrieved from http://www.smaato.com/download/pressarea/Smaato_CTIA_20071022_release.pdf.

(Continued)

*Primary Examiner* — Philip Wang
(74) *Attorney, Agent, or Firm* — Nathan O. Greene; Brink Hofer Gilson & Lione

(57) ABSTRACT

Disclosed is a method for facilitating quick mobile website creation by mobile advertisers, including providing access to an advertiser of a mobile marketing application that interfaces with an ad server, wherein the advertiser is authenticated for access to the ad server; enabling the advertiser to input to an interface of the application a plurality of content items selected from the group consisting of a descriptive text, an image, a phone number, and a hyperlink; presenting the advertiser with a go live option; automatically creating the mobile website to include the submitted content items when the go live option is selected, wherein the application facilitates rapid creation by the advertiser of a mobile website having a plurality of web pages, and the mobile website is optimized for mobile delivery; subjecting the created mobile website to a plurality of error checks; and publishing the mobile website to a network through a mobile service provider system.

26 Claims, 15 Drawing Sheets

U.S. PATENT DOCUMENTS

| | | | |
|---|---|---|---|
| 6,928,615 B1 | 8/2005 | Haitsuka et al. | 345/340 |
| 6,985,742 B1 | 1/2006 | Giniger et al. | 455/414.3 |
| 7,043,483 B2 | 5/2006 | Colace et al. | 707/3 |
| 7,120,235 B2 | 10/2006 | Altberg et al. | |
| 7,197,475 B1* | 3/2007 | Lorenzen et al. | 705/26.81 |
| 7,277,718 B2 | 10/2007 | Wong | |
| 7,363,024 B2 | 4/2008 | Jenkins | 455/412.1 |
| 7,802,280 B2 | 9/2010 | Zigmond et al. | |
| 2002/0023001 A1 | 2/2002 | McFarlin et al. | |
| 2002/0046259 A1 | 4/2002 | Glorikian | 709/203 |
| 2002/0073034 A1* | 6/2002 | Wagner et al. | 705/51 |
| 2002/0078101 A1 | 6/2002 | Chang et al. | 707/516 |
| 2003/0046161 A1 | 3/2003 | Kamangar et al. | 705/14 |
| 2003/0149938 A1 | 8/2003 | McElfresh et al. | 715/517 |
| 2004/0039733 A1 | 2/2004 | Soulanille | 707/3 |
| 2004/0054576 A1 | 3/2004 | Kanerva et al. | 709/206 |
| 2004/0093327 A1 | 5/2004 | Anderson et al. | 707/1 |
| 2004/0186776 A1 | 9/2004 | Llach | 709/200 |
| 2005/0010477 A1 | 1/2005 | Sullivan et al. | 705/10 |
| 2005/0154746 A1 | 7/2005 | Liu et al. | 707/5 |
| 2005/0165640 A1 | 7/2005 | Kotorov | |
| 2005/0174975 A1 | 8/2005 | Mgrdechian et al. | 370/338 |
| 2006/0085419 A1 | 4/2006 | Rosen | 705/1 |
| 2006/0149630 A1 | 7/2006 | Elliott et al. | 705/14 |
| 2006/0159063 A1* | 7/2006 | Kumar | 370/352 |
| 2006/0172697 A1 | 8/2006 | Gallego et al. | 455/522 |
| 2006/0194572 A1* | 8/2006 | Fresonke et al. | 455/414.1 |
| 2006/0194595 A1 | 8/2006 | Myllynen et al. | 455/412.2 |
| 2007/0067267 A1* | 3/2007 | Ives | 707/3 |
| 2007/0174118 A1* | 7/2007 | Dekel et al. | 705/14 |
| 2007/0174490 A1 | 7/2007 | Choi et al. | 709/246 |
| 2007/0198339 A1 | 8/2007 | Shen et al. | |
| 2007/0271510 A1* | 11/2007 | Grigoriu et al. | 715/533 |
| 2007/0282675 A1 | 12/2007 | Varghese | |
| 2008/0086369 A1 | 4/2008 | Kiat et al. | |
| 2009/0063500 A1* | 3/2009 | Zhai et al. | 707/10 |

OTHER PUBLICATIONS

"Strong Partners for Effective Mobile Advertising: Adconion Media Group and Smaato Enter Strategic Partnership," San Mateo / Munich, Germany—May 9, 2007, 2 pages. Retrieved from http://www.smaato.com/download/pressarea/Smaato_AMD_20070503_release.pdf.

"Smaato—Media / Developers," pp. 1-2, http://www.smaato.com/mo_mediadev.php, available at least as of Jan. 3, 2008.

"Smaato—Mobile Carriers," pp. 1-2, http://www.smaato.com/mo_carriers.php, available as least as of Jan. 3, 2008.

"Smaato—Mobile Marketing," pp. 1-2, http://www.smaato.com/mobile.php, available at least as of Jan. 3, 2008.

"ESME," *Wikipedia, the free encyclopedia,* p. 1, http://en.wikipedia.org/wiki/ESME, last modified Dec. 20, 2006, last visited Oct. 9, 2007.

"Network Switching Subsystem," *Wikipedia, the free encyclopedia,* pp. 1-6, http://en.wikipedia.org/wiki/Network_Switching_Subsystem, last modified Oct. 9, 2007, last visited Oct. 9, 2007.

"Short message service," *Wikipedia, the free encyclopedia,* pp. 1-5, http://en.wikipedia.org/wiki/Short_message_service, last modified Oct. 9, 2007, last visited Oct. 9, 2007.

"Short message service center," *Wikipedia, the free encyclopedia,* pp. 1-2, http://en.wikipedia.org/wiki/Short_message_service_center, last modified Sep. 11, 2007, last visited Oct. 9, 2007.

"Signal Transfer Point," *Wikipedia, the free encyclopedia,* p. 1, http://en.wikipedia.org/wiki/Signal_transfer_point, last modified Aug. 16, 2007, last visited Oct. 9, 2007.

"My First 6 Yahoo Panama 'Enhancement' Requests [Archive]", *Search Engine Watch Forums,* pp. 1-2, http://forums.searchenginewatch.com/archive/index.php/t-15882.html, containing posts from Jan. 18, 2007 to Jan. 25, 2007, last visited Apr. 23, 2008.

"Limbo Offers Purina Pet Lowdown," *Adweek,* pp. 1-2, http://www.adweek.com/aw/iq_interactive/article_display.jsp?vnu_content_id=1003665626, dated Oct. 31, 2007, last visited Apr. 1, 2008.

International Search Report from related International Patent Application No. PCT/US2009/032797, dated Jul. 31, 2009 (3 pages).

Office Action from related U.S. Appl. No. 12/026,526, dated Feb. 25, 2011 (25 pages).

Office Action from related U.S. Appl. No. 12/026,531, dated Feb. 10, 2011 (19 pages).

* cited by examiner

YAHOO! SEARCH MARKETING MOBILE BETA

Welcome, ysmmobile [Sign Out]

| Account | Campaigns | Billing | Reports |

Campaign Summary | Listing Management | Editorial Status

Editorial Status

Campaign: [ysmmobile_test] Type: [All] [GO]  Account: [Mobile Test A/C (201016583)]

| Search Term | Carrier | Submitted | Status | Status Date | Estimated Completion | Decline/Remove Reasons |
|---|---|---|---|---|---|---|
| test 2 | Orange | 8/14/06 | Declined | 8/14/06 | | Duplicate |
| test 2 | Orange | 8/14/06 | Pending | | | |
| test 2 | T-Mobile | 8/14/06 | Approved | 8/14/06 | | |
| test 8 | T-Mobile | 8/23/06 | Approved | 8/23/06 | | |
| sb new test | Vodafone | 9/14/06 | Declined | 9/14/06 | | Match Type Modified , T/D: Superlative/Bad Text , T/D: Contact Info |
| test 2 | Vodafone | 8/14/06 | Approved | 8/14/06 | | |
| test 2 | 3 | 8/14/06 | Approved | 8/14/06 | | |
| sb new test | Orange | 9/14/06 | Declined | 9/14/06 | | Match Type Modified , T/D: Superlative/Bad Text , T/D: Contact Info |
| test 2 | O2 | 8/14/06 | Approved | 8/14/06 | | |
| sb new test | O2 | 9/14/06 | Declined | 9/14/06 | | Match Type Modified , T/D: Superlative/Bad Text , T/D: Contact Info |
| doug new test | 3 | 8/24/06 | Approved | 8/24/06 | 8/27/06 | |
| ARAZ | Orange | 8/14/06 | Pending | | | |
| ARAZ | Orange | 9/14/06 | Approved | 8/14/06 | | |
| sb new test | T-Mobile | 9/14/06 | Declined | 9/14/06 | | Match Type Modified , T/D: Superlative/Bad Text , T/D: Contact Info |
| test 8 | 3 | 8/23/06 | Approved | 8/23/06 | | |
| sb new test | 3 | 9/14/06 | Declined | 9/14/06 | | Match Type Modified , T/D: Superlative/Bad Text , T/D: Contact Info |

| Summary | Editorial Status | Import | Search |

Homestore/ Homestyles › Campaign: Test 45019 › Ad Group Test 45019

Create Your Ad: Test 45019

To change Carrier Status Settings, click here to jump to the table below

1240

1204 — Standard Title and Description ?* (40 Characters max)
[This Is A Standard Test] — Character Count 23/40

Ad Preview
Enter your title, description and URL to preview
Note: The display URL may not be shown depending on the implementation by the publisher 1208 — Short Title and Description ?* (20 Characters max)
[This Is A Test] 14/20

Standard Ad Preview

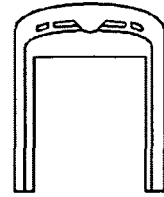
— 1242

1212 — Phone Number: (123-456-789)
[123-456-789] 0/10

1216 — Email Address: (alex@yahoo.com)
[ ] 0/40

1220 — SMS Number:
[123-456-789] 0/10

1224 — Street Address
[ ]

Short Ad Preview

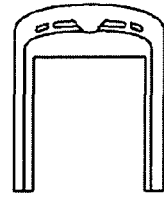
— 1244

1228 — Destination URL ?* (1024 Characters max)
[http://] 7/1024
If you do not have a mobile website, click here to create one 1232 — Display URL ?* (20 Characters max)   ⟵ 1246
[This Is A Standard Test] 0/20

1236 — Name this Ad ?*
[Test 45019_002]

Selected Carriers

1250   Use the following to choose specific carriers (from those selected at the Ad Group level), on which you want to show this ad:

| 1. Carriers | 2. Status | |
|---|---|---|
| | Online | Offline |
| Alltel | ● | ○ |
| AT&T | ● | ○ |
| Nextel | ● | ○ |
| Sprint | ● | ○ |
| T-mobile | ● | ○ |
| Verizon | ● | ○ |
| Other | ● | ○ |

[ Save ]  [ Submit ]
 1260    1264

FIG. 12

MOBILE MARKETING APPLICATION

TECHNICAL FIELD

The present description relates generally to a system and methods for creating mobile websites and related advertisements to be served over mobile devices, and more particularly, but not exclusively, to integrating third party mobile marketing applications for mobile website generation into a service provider's advertiser interface for advertisement creation related to the generated mobile website.

BACKGROUND

The mobile phone may be increasingly important as an information and content access device. Currently there may be over 2 billion mobile phones globally, versus 800 million personal computers. Mobile operators may be increasingly looking to high value data services as a way to overcome the continuing voice Average Revenue Per User (ARPU) decline. Billions of dollars may be being spent globally on wireless licenses with billions more in investments in the pipeline for development of infrastructure and services by wireless service and content providers. Mobile carriers may be introducing new data, content and multimedia services as a means of generating new revenue stream, reversing negative ARPU trends, retaining and attracting customers as well as increasing returns on investment, and extending and differentiating their service offering to consumers. The emergence of these wireless technologies may be creating unique opportunities for wireless carriers, advertisers and publishers to generate additional revenue streams through new and existing customers. As consumer adoption of wireless technology continues to increase, marketing via mobile devices may become an important part of all integrated data communications strategies.

Mobile marketing may benefit consumers, mobile service providers, publishers and advertisers by driving incremental revenue, enhancing consumer loyalty and providing convenience for mobile consumers. Mobile data acceptance may have arrived in many parts of the World and may be expected to increase. Mobile destination portals such as YAHOO! may monetize the mobile searches.

The global business model of mobile marketing to date may depend upon subscription revenue and purchases of consumables (i.e. ring tones, wallpapers, etc.). Slow roll-out and relatively small incremental revenue streams may be jeopardizing return on investment on current and future investments. Wireless advertising may now be seen as the great hope in accelerating revenue growth, especially given the experience of online web advertising. Search may be emerging as both a key feature and a potential universal interface for discovering and accessing mobile information.

However, usage patterns for mobile search and Web search may differ, as well as the expectations of the users and the advertisers. Combined with a completely different user experience, these may change the value of clicks and lead opportunities. Most current mobile devices may have limited browser capabilities that do not support the rich feature set of the Web. Handset capabilities may impact the search behavior of mobile users, where the limitations of numeric-pad keyed entry narrow the searched for terms. The small screen size on mobile devices may have an impact on the performance of the search implementations. The size of screens on mobile handsets may limit the creative that can be displayed per listing, and the number of listings per screen. Current web search marketing systems may not account for these physical differences between mobile handsets and computers.

The mobile market place may be very fragmented in terms of handset and network technologies, and this may impact the display of listings and advertiser offer sites. For mobile devices, there may not be an HTML-like standard adhered to by all carriers, and the "standards" that are present may tend to be operator (mobile-carrier) specific, and may be incompatible with other "standards." This may lead to markets within markets, where, for example in Japan, advertisers may create separate sites and campaigns for mobile internet service provider (ISP) users, and XHTML and WML users. This fragmentation may also be barrier to entry for advertisers due to the investment required to support the different technologies and interact with each individual mobile carrier. Advertisers may be faced with either a large start-up investment, or foregoing traffic from certain operators.

SUMMARY

Systems and methods are disclosed for rapid creation of mobile websites and related advertisements to be served over mobile devices, and to integrate third party mobile marketing applications for mobile website generation into a service provider's advertiser interface for advertisement creation related to the generated mobile website.

According to one aspect, a method is disclosed for facilitating quick mobile website creation by mobile advertisers, including providing access to an advertiser of a mobile marketing application that interfaces with an ad server, wherein the advertiser is authenticated for access to the ad server; enabling the advertiser to input to an interface of the application a plurality of content items selected from the group consisting of a descriptive text, an image, a phone number, and a hyperlink; presenting the advertiser with a go live option; automatically creating the mobile website to include the submitted content items when the go live option is selected, wherein the application facilitates rapid creation by the advertiser of a mobile website having a plurality of web pages, and the mobile website is optimized for mobile delivery; subjecting the created mobile website to a plurality of error checks; and publishing the mobile website to a network through a mobile service provider system.

According to another aspect, a method is disclosed for integrating third party applications for rapid mobile website creation by mobile advertisers, including providing a mobile marketing application from a third party provider different than a mobile service provider; integrating an advertiser interface of the mobile marketing application with a user interface (UI) of an ad server of the mobile service provider; enabling an advertiser to login to the mobile marketing application using a same set of login credentials as used for access to the ad server; enabling the advertiser to input to the advertiser interface of the mobile marketing application a plurality of content items to create a mobile website that displays the content items and that is optimized for mobile delivery; automatically creating the mobile website; and enabling the advertiser to create an advertisement from the UI of the ad server that links to the mobile website created by the mobile marketing application. The method may further include automatically creating a destination uniform resource locator (URL) to be affiliated with the created mobile website; generating a display URL based on the destination URL according to one or more of the following criteria: a domain name of the display URL coincides with that of the service provider; a name affiliated with the advertiser is suffixed to the domain name; the mobile website name is included in the display URL; the display URL is valid; and the display URL is unique among a plurality of URLs affiliated with a plurality of advertiser mobile sites of the service provider system; and transmitting the destination and display URLs to the ad server to create the advertisement that links to mobile website.

According to another aspect, a system is disclosed for facilitating quick mobile website creation by mobile advertisers, including a memory to store instructions of a mobile marketing application, a mobile website data, and a mobile carrier data. An interface is operatively connected to the memory to communicate with advertisers that use a mobile device or a web-based computer. A processor operatively connected to the memory and the interface to execute the instructions, wherein the processor ensures the integration of the interface with an advertiser user interface (UI) of an ad server to facilitate creation of a mobile website by the advertiser. The processor automatically creates a destination uniform resource locator (URL) to be affiliated with the mobile website, generates a display URL based on the destination URL, and enables transmittal of the destination and display URLs to the ad server to enable creation of a mobile advertisement that operably links to the mobile website.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 11 is a screenshot of a revenue generator's listing management screen showing a mobile site URL entry in the systems of FIG. 1 and FIG. 2, or other systems for serving advertisements over mobile devices.

FIG. 12 is a screenshot of a revenue generator's advertisement creation screen in the systems of FIG. 1 and FIG. 2, or other systems for creating advertisements destined for mobile devices.

DETAILED DESCRIPTION

A system and method, generally referred to as a system, relate to serving advertisements over mobile devices, and more particularly, but not exclusively, to serving advertisements targeted to mobile devices of individual mobile network operators. The principles described herein may be embodied in many different forms.

Figure 1:
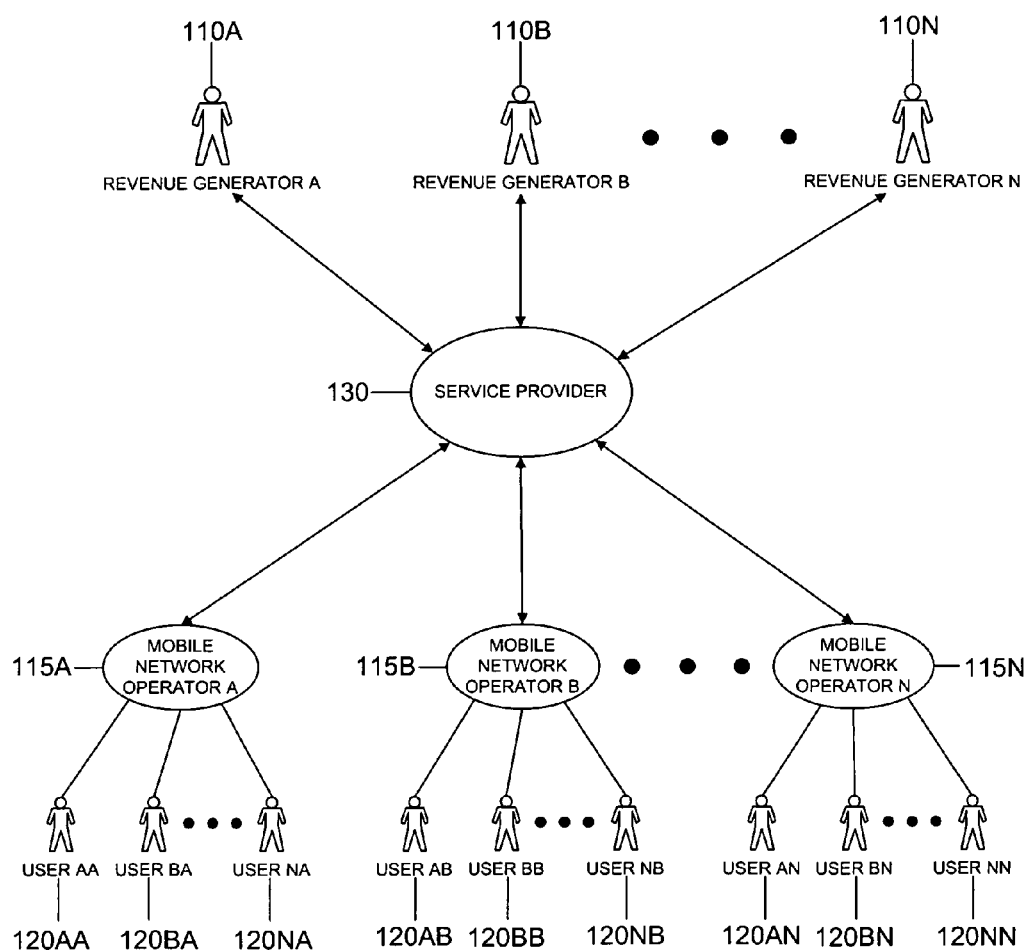
FIG. 1 is a block diagram of a general overview of a system for creating and serving advertisements over mobile devices.

FIG. 1 provides a general overview of a system 100 for serving advertisements over mobile devices. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more revenue generators 110A-N, such as mobile advertisers, a service provider 130, such as a portal, one or more mobile network operators ("MNOs") 115A-N, more commonly referred to as mobile carriers or simply carriers, and one or more users 120AA-NN, such as mobile subscribers or consumers. The revenue generators 110A-N may pay the service provider 130 to display advertisements, such as on-line advertisements on a network such as a mobile network or the Internet. The payments may be based on various factors, such as the number of times an advertisement may be displayed to the users 120AA-NN and/or the number of times one of the users 120AA-NN may click through the advertisement to the revenue generator's web site or mobile site.

The service provider 130 may maintain a mobile site or mobile portal, such as a search site, where the service provider 130 may display advertisements of the revenue generators 110A-N to the users 120AA-NN. The service provider 130 may share revenue with the MNOs 115A-N for displaying advertisements of the revenue generators 110A-N on their mobile networks. Alternatively or in addition the service provider 130 may share revenue with individual mobile publishers for displaying advertisements of the revenue generators 110A-N on their mobile sites.

The users 120AA-NN may be consumers of goods or services who may be searching for a business such as the business of one of the revenue generators 110A-N. The users 120AA-NN may communicate with the service provider 130 through the mobile network operators 115A-N. The users 120AA-NN may supply information describing themselves to the service provider 130, such as the location, gender, or age of the users 120AA-NN, or generally any information that may be required for the users 120AA-NN to utilize the services provided by the service provider 130. Alternatively or in addition the service provider 130 may obtain information about the users 120AA-NN from the MNOs 115A-N.

In the system 100, the revenue generators 110A-N may interact with the service provider 130, such as via a web application. The revenue generators 110A-N may send information, such as billing, website or mobile site and advertisement information, to the service provider 130 via the web application. The web application may include a web browser or other application such as any application capable of displaying web content. The application may be implemented with a processor such as a personal computer, personal digital assistant, mobile phone, or any other machine capable of implementing a web application.

The users 120AA-NN may also interact individually with the service provider 130, through the mobile network operators 115A-N, such as via a mobile phone or any device capable of communicating with the mobile network operators 115A-N. The users 120AA-NN may interact with the service provider 130 via a mobile web-based application, a mobile standalone application, or any application capable of running on a mobile device. The service provider 130 may communicate data to the revenue generators 110A-N over a network and to the users 120AA-NN over a network via the MNOs 115A-N. The following examples may refer to a revenue generator A 110A as an online advertiser or mobile advertiser; however, the system 100 may apply to any revenue generators 110A-N who may desire to serve advertisements over mobile devices.

In operation, one of the revenue generators 110A-N, such as revenue generator A 110A, may provide information to the service provider 130. This information may relate to the transaction taking place between the revenue generator A 110A and the service provider 130, or may relate to an account the revenue A 110A generator maintains with the service provider 130. In the case of a revenue generator A 110A who is a mobile advertiser, the revenue generator A 110A may provide initial information necessary to open an account with the service provider 130.

A revenue generator A 110A who is an mobile advertiser may maintain one or more accounts with the service provider 130. For each account the revenue generator A 110A may maintain one or more campaigns. For each campaign the revenue generator A 110A may maintain one or more listings. A listing may include a search keyword and one or more carrier listings. Each carrier listing may identify the mobile carrier and may include an advertisement title, an advertisement description, a bid amount and a mobile site uniform resource locator (URL), if any. A carrier listing may represent an association between a search keyword, a mobile advertisement and a carrier whose users are targeted by the mobile advertisement.

The carrier listings may allow the service provider 130 to provide a mobile advertising marketplace separate from the web advertising marketplace, essentially separating the web keywords from the mobile keywords. The carrier listings may also allow the service provider 130 to provide a separate marketplace for each of the MNOs 115A-N, essentially separating the keywords associated with each of the MNOs 115A-N. For example, the revenue generator A 110A may place one bid on the keyword "dvd" for the MNO A 115A and a separate bid for the keyword "dvd" for the MNO B 115B. Furthermore, by creating a separate marketplace for each of the MNOs 115A-N, the revenue generator A 110A may create separate advertisements compatible with the underlying technology of each MNO.

The service provider 130 may implement the separation of keywords by utilizing a data field to indicate to which carrier a carrier listing may apply. For example, a revenue generator A 110A may have several listings for the same keyword; however, they may be differentiated by a data field indicating to which carrier each listing applies. Alternatively or in addition, if the database architecture does not support the addition of a separate field, or if the service provider 130 wishes to utilize the functionality of an existing web search marketing system, the keywords for each carrier may be separated by adding prefixes to the keywords. In this case, each of the carriers may be identified by a unique prefix identifier. The prefix identifier may include a combination of the geographical location of the carrier and a descriptor of the carrier. For example, the carrier SPRINT may have a prefix of "usmobsprintsb."

The prefix may be separated from the keyword by a keyword separator, such as the character string "vxv." The purpose of the keyword separator may be to identify the location in the character string where the prefix ends and the keyword begins. The "vxv" keyword separator may be particularly functional in this regard, because this sequence of letters may very rarely, or never, appear in the English language. Thus, the presence of the "vxv" character string may indicate the end of the prefix and the beginning of the keyword. For example, if the revenue generator A 110A bid on the keyword "dvd" for users on the carrier SPRINT, the keyword may be stored in an existing search marketing database as "usmobsprintsbvxvdvd." The service provider 130 may later search for the advertisements associated with SPRINT for the keyword "dvd" by searching for the keyword "usmobsprintsbvxvdvd."

If the revenue generator A 110A does not have a mobile site URL for the MNO A 115A, the revenue generator A 110A may still bid on a keyword for the MNO A 115A. In this case, the service provider 130 may dynamically create a "WAP ad." The "WAP ad" may be an offer landing page containing the phone number of the advertiser and/or the logo of the advertiser. When a user AA 120AA clicks on the advertisement of the revenue generator A 110A who does not have a mobile site, the user AA 120AA may be taken to a page showing the phone number and/or logo of the revenue generator A 110A. The user AA 120AA may then use their mobile device to call the phone number of the revenue generator A 110A and complete their transaction. The data associated with the "WAP ad" may be stored in the advertisement title and/or the advertisement description fields.

The keywords may represent one or more search terms that the revenue generator A 110A wishes to associate with their advertisement. When a user AA 120AA searches for a search keyword via MNO A 115A, the mobile advertisement of the revenue generator A 110A may be displayed on the search results page. The service provider 130 may also implement directory search implementations, where the user AA 120AA may click through directories of families of related data. In this instance, the search keyword may be the name of the directory on which the user AA 120AA clicks. Alternatively or in addition the user AA 120AA may interact with the service provider 130 through an SMS search service.

For example, a revenue generator A 110A, such as GENERAL MOTORS, may desire to target a mobile advertisement for a GENERAL MOTORS JEEP to users 120AA-NA on MNO A 115A searching for the keywords "JEEP." GENERAL MOTORS may place a bid with the service provider 130 for the keyword "JEEP" on MNO A 115A. The mobile advertisement of the revenue generator A 110A may be displayed when one of the users 120AA-NA on the MNO A 115A searches for the keyword "JEEP," or clicks through a directory named "JEEP." GENERAL MOTORS may be able to use the same interface to submit bids for "JEEP" on any of the MNOS 115A-N.

The advertisement title may represent the data the revenue generator A 110A wishes to be displayed to a user AA 120AA when the user AA 120AA searches for the keyword associated with the listing. Alternatively or in addition, the advertisement description may represent the data the revenue generator A 110A wishes to be displayed to a user AA 120AA when the user AA 120AA searches for the keyword associated with the listing. The mobile site URL may represent the link the revenue generator A 110A wishes a user AA 120AA to be directed to upon clicking on the mobile advertisement of the revenue generator A 110A, such as the home page of the revenue generator A 110A. The bid amount may represent a maximum amount the revenue generator A 110A may be willing to pay each time a user AA 120AA may click on the mobile advertisement of the revenue generator A 110A or each time the mobile advertisement of the revenue generator A 110A may be shown to a user AA 120AA.

There may be some instances where multiple revenue generators 110A-N may have bid on the same search keyword for the same MNO, such as MNO A 115A. The service provider 130 may serve to the users 120AA-NA the online advertisements on which the users 120AA-NA may be most likely to click. For example, the service provider 130 may include a relevancy assessment to determine the relevancy of the multiple mobile advertisements to the search keyword. The more relevant a mobile advertisement may be to the keyword the more likely it may be that the user AA 120AA may click on the advertisement. Methods for assessing relevancy in online web search marketing may also apply to mobile search marketing.

When one of the users 120AA-NN, such as the user AA 120AA, interacts with the service provider 130, such as by searching for a keyword, the service provider 130 may retain data describing the interaction with the user AA 120AA. The retained data may include the keyword searched for, the geographic location of the user AA 120AA, and the date/time the user AA 120AA interacted with the service provider 130. The data may also generally include any data available to the service provider 130 that may assist in describing the interaction with the user AA 120AA, or describing the user AA 120AA. The service provider 130 may also store data that indicates whether a mobile advertisement of one of the revenue generators 110A-N, such as the revenue generator A 110A, was displayed to the user AA 120AA, and whether the user AA 120AA clicked on the mobile advertisement.

The service provider 130 may already have information relating to the geographic location of the user AA 120AA and other information describing the user A 120A, such as gender, age, etc. This information may have been previously supplied to the service provider 130 by the user AA 120AA. Alternatively or in addition, the service provider 130 may obtain the location of the user AA 120AA based on the IP address of the user AA 120AA. The service provider 130 may use a current date/time stamp to store the date/time when the user AA 120AA interacted with the service provider 130. The service provider 130 may use any of the information describing the user or the keyword searched for by the user the relevancy of an advertisement to the search.

Furthermore, the service provider 130 may generate reports based on the data collected from the user interactions and communicate the reports to the revenue generators 110A-N to assist the revenue generators 110A-N in measuring the effectiveness of their mobile advertising. The reports may indicate the number of times the users 120AA-NN searched for the keywords bid on by the revenue generators 110A-N, the number of times a mobile advertisement of the revenue generators 110A-N was displayed to the users 120AA-NN, and the number of times the users 120AA-NN clicked through on the advertisements of the revenue generators 110A-N. There may be a separate report for each MNO 115A-N for which the revenue generator A 110A maintains a carrier listing. There may be a report displaying the aggregate data across all of the MNOs 115A-N for which the revenue generator A 110A maintains an carrier listing. The reports may also generally indicate any data that may assist the revenue generators 110A-N in measuring the effectiveness of their mobile advertising campaigns.

Figure 2:
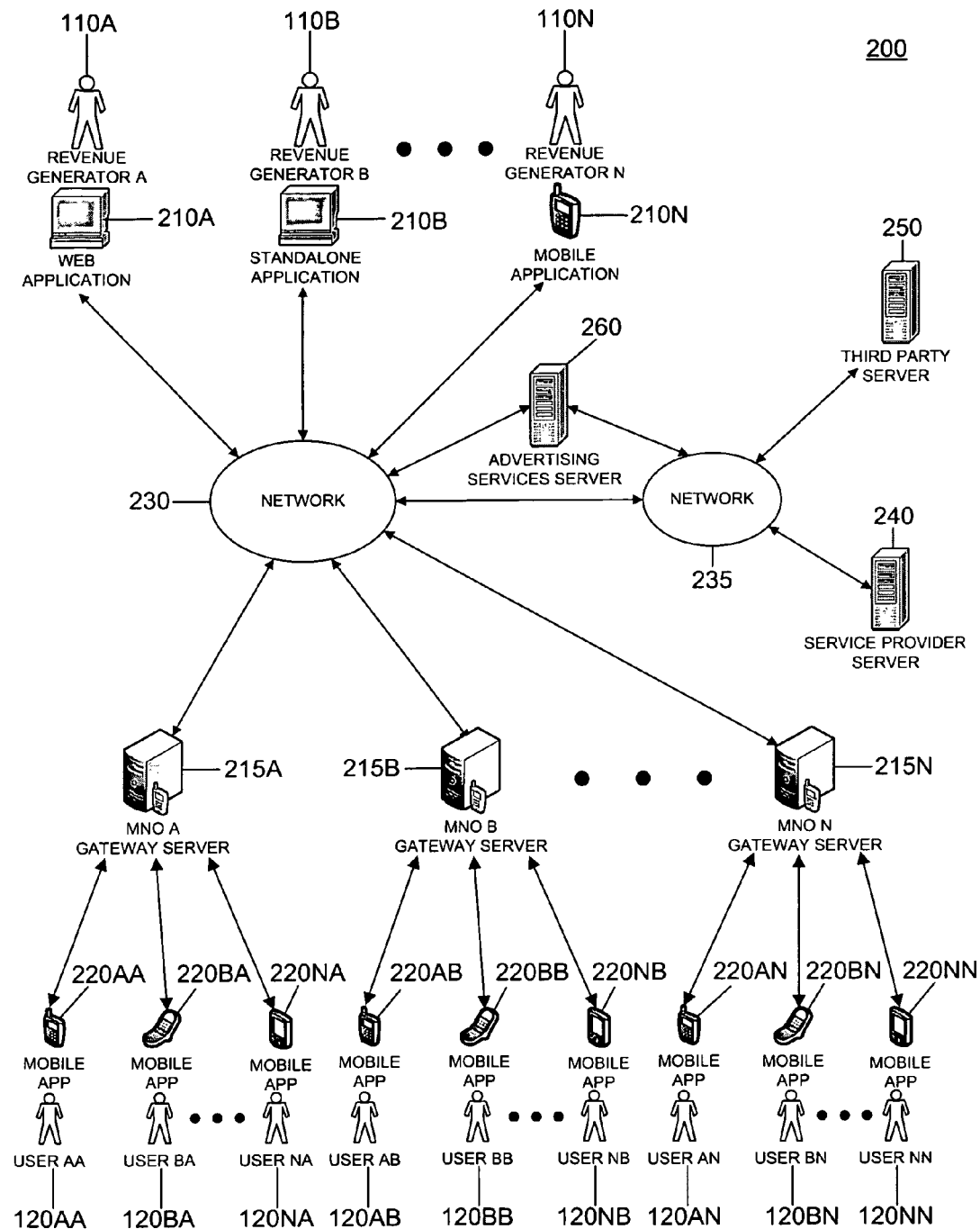
FIG. 2 is block diagram of a simplified view of a network environment implementing a system for creating and serving advertisements over mobile devices.

FIG. 2 provides a simplified view of a network environment implementing a system 200 for serving advertisements over mobile devices. Not all of the depicted components may be required, however, and some implementations may include additional components not shown in FIG. 2. Variations in the arrangement and type of the components may be made without departing from the spirit or scope of the disclosure. Additional, different or fewer components may be provided.

The system 200 may include one or more web applications, standalone applications and mobile applications 210A-N, which may be collectively or individually referred to as client applications of the revenue generators 110A-N. The system 200 may also include one or more mobile applications, or mobile applications 220AA-NN, which may collectively be referred to as client applications of the users 120AA-NN, or individually as a user client application. The system 200 may also include one or more MNO gateway servers 215A-N, a network 230, a network 235, the service provider server 240, a third party server 250, and an advertising services server 260.

Some or all of the advertising services server 260, service provider server 240, and third-party server 250 may be in communication with each other by way of network 235 and may be the system or components described below in FIG. 5. The advertising services server 260, third-party server 250 and service provider server 240 may each represent multiple linked computing devices. Multiple distinct third party servers, such as the third-party server 250, may be included in the system 200. The third-party server 250 may be an MNO gateway server 215A-N or a server associated with, or in communication with an MNO gateway server 215A-N.

The networks 230, 235 may include wide area networks (WAN), such as the Internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The revenue generators 110A-N may use a web application 210A, standalone application 210B, or a mobile application 210N, or any combination thereof, to communicate to the service provider server 240, such as via the networks 230, 235. The service provider server 240 may communicate to the revenue generators 110A-N via the networks 230, 235 through the web applications, standalone applications or mobile applications 210A-N.

The users 120AA-NN may use a mobile application 220AA-220NN, such as a mobile web browser, to communicate with the service provider server 240 via the MNO gateway servers 215A-N and the networks 230, 235. The service provider server 240 may communicate to the users 120A-N via the networks 230, 235 and to the MNOs 215A-N through the mobile applications 220AA-NN.

The web applications, standalone applications and mobile applications 210A-N, 220AA-NN may be connected to the network 230 in any configuration that supports data transfer. This may include a data connection to the network 230 that may be wired or wireless. Any of the web applications, standalone applications and mobile applications 210A-N, 220AA-NN may individually be referred to as a client application. The web application 210A may run on any platform that supports web content, such as a web browser or a computer, a mobile phone, personal digital assistant (PDA), pager, network-enabled television, digital video recorder, such as TIVO® or a digital video recorder (DVR), automobile and/or any appliance capable of data communications.

The standalone applications 210B may run on a machine that may have a processor, memory, a display, a user interface and a communication interface. The processor may be operatively connected to the memory, display and the interfaces and may perform tasks at the request of the standalone applications 210B or the underlying operating system. The memory may be capable of storing data. The display may be operatively connected to the memory and the processor and may be capable of displaying information to the revenue generator B 110B. The user interface may be operatively connected to the memory, the processor, and the display and may be capable of interacting with a revenue generator A 110A. The communication interface may be operatively connected to the memory, and the processor, and may be capable of communicating through the networks 230, 235 with the service provider server 240, third party server 250 and advertising services server 260. The standalone applications 210B may be programmed in any programming language that supports communication protocols. These languages may include: SUN JAVA, C++, C#, ASP, SUN JAVASCRIPT, asynchronous SUN JAVASCRIPT, or ADOBE FLASH ACTIONSCRIPT, amongst others.

The mobile applications 21 ON, 220AA-NN may run on any mobile device which may have a data connection. The mobile applications 21 ON, 220AA-NN may be a web application 210A, a standalone application 210B, or a mobile browser. The mobile device may be one of a broad range of electronic devices which may include mobile phones, PDAs, and laptops and notebook computers. The mobile device may have a reduced feature set, such as a smaller keyboard and/or screen, and may be incapable of supporting a traditional web search.

The data connection of the mobile device may be a cellular connection, such as a GSM/GPRS/WCDMA connection, a wireless data connection, an Internet connection, an infra-red connection, a Bluetooth connection, or any other connection capable of transmitting data. The data connection may be used to connect directly to the network 230, or to connect to the network 230 through the MNO gateway servers 215A-N. The MNO gateway servers 215A-N may control the access that the mobile applications 210AA-NN may have to the network. The MNO gateway servers 215A-N may also control the technology supporting the respective mobile applications 220AA-NN. This may affect all aspects of the user experience, such as signal strength and availability, speed and billing mechanisms. For example, the MNO gateway server A 215A may only allow the users 120AA-NA access to content provided by partners of the MNO A 115A. Furthermore, the MNO gateway servers 215A-N may only allow users 120AA-NN access to data in a specific format, such as WML, XHTML, NTT DOCOMO IMODE HTML, or cHTML. Alternatively or in addition, the mobile applications 220AA-NN may only support one of the aforementioned formats.

The service provider server 240 may include one or more of the following: an application server, a data source, such as a database server, a middleware server, and an advertising services server. One middleware server may be a mobile commerce platform, such as the YAHOO! SUSHI platform, which may properly encode data, such as mobile pages or mobile advertisements, to the formats specific to the MNO gateway servers 215A-N. The service provider server 240 may co-exist on one machine or may be running in a distributed configuration on one or more machines. The service provider server 240 may collectively be referred to as the server. The service provider server 240 may receive requests from the users 120AA-NN and the revenue generators 110A-N and may serve mobile pages to the users 120AA-NN and web pages and/or mobile pages to the revenue generators 110A-N based on their requests.

The third party server 250 may include one or more of the following: an application server, a data source, such as a database server, a middleware server, and an advertising services server. The third party server 250 may co-exist on one machine or may be running in a distributed configuration on one or more machines. The advertising services server 260 may provide a platform for the inclusion of advertisements in pages, such as web pages or mobile pages. The advertising services server 260 may be used for providing mobile advertisements that may be displayed to the users 120AA-NN.

Figure 5:
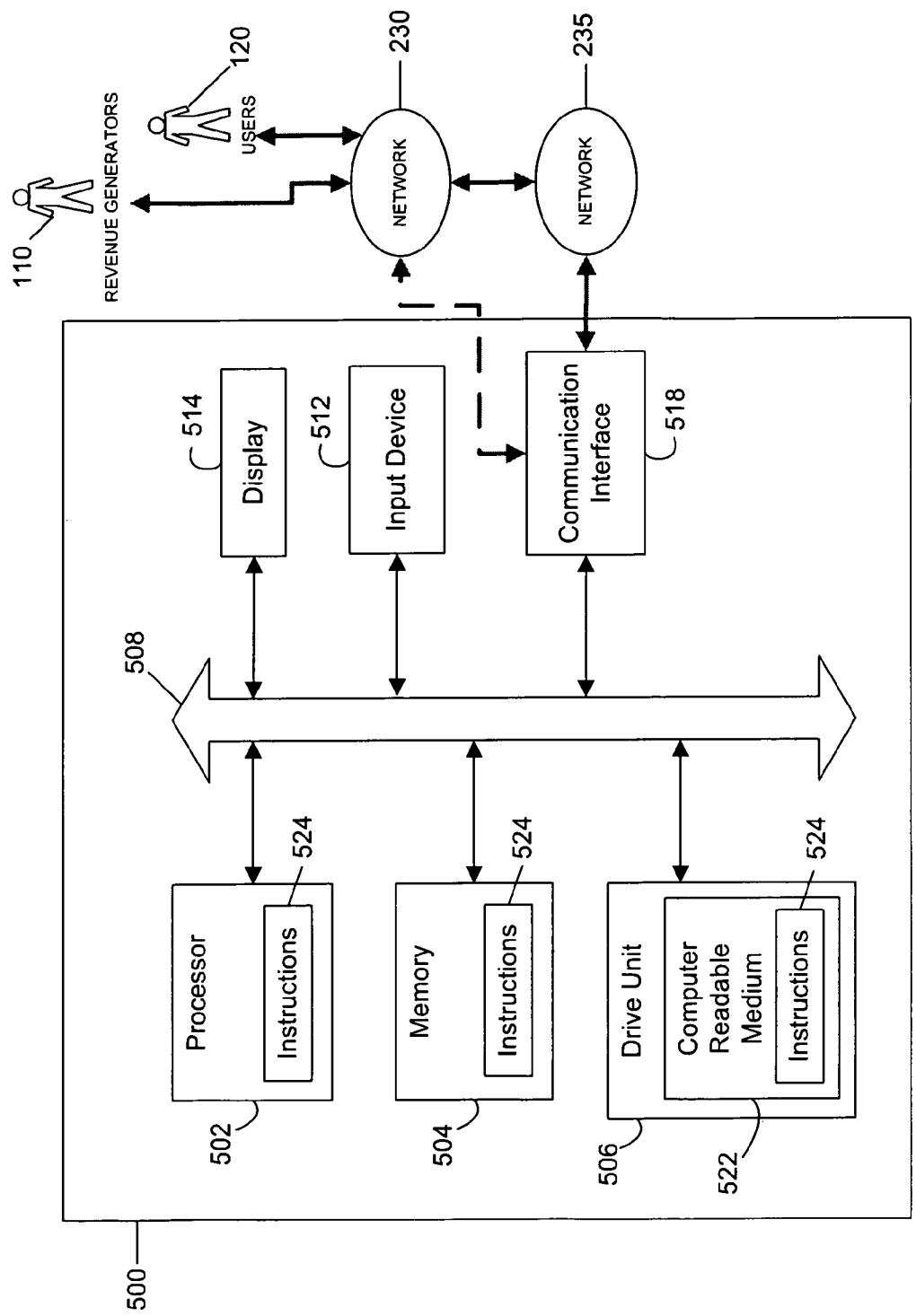
FIG. 5 is an illustration of a general computer system that may be used in a system for content filtering advertisements before approval of service of the advertisements through a publisher (or service provider) to a mobile device.

The service provider server 240, the third party server 250 and the advertising services server 260 may be one or more computing devices of various kinds, such as the computing device in FIG. 5. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 210A may employ HTTP to request information, such as a web page, from a web server, which may be a process executing on the service provider server 240 or the third-party server 250.

There may be several configurations of database servers, application servers, middleware servers and advertising services servers included in the service provider server 240 or the third party server 250. Database servers may include MICROSOFT SQL SERVER, ORACLE, IBM DB2 or any other database software, relational or otherwise. The application server may be APACHE TOMCAT, MICROSOFT IIS, ADOBE COLDFUSION, YAPACHE or any other application server that supports communication protocols. The middleware server may be any middleware that connects software components or applications. The application server on the service provider server 240 or the third party server 250 may serve pages, such as web pages to the users 120A-N and the revenue generators 110A-N. The advertising services server 260 may provide a platform for the inclusion of advertisements in pages, such as web pages. The advertising services server 260 may also exist independent of the service provider and the third party servers 240, 250.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

Figure 3:
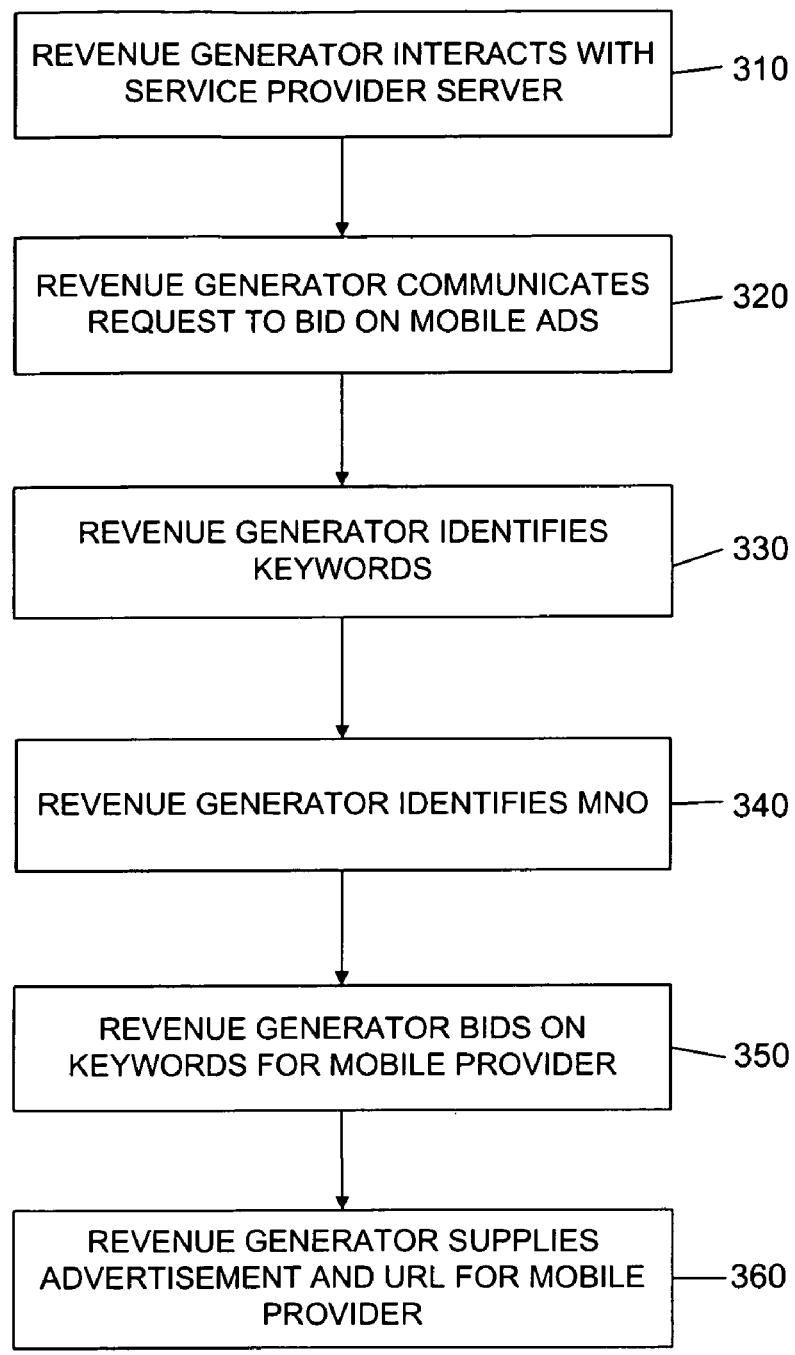
FIG. 3 is a flowchart illustrating steps that may be taken by a revenue generator in the systems of FIG. 1 and FIG. 2, or other systems for serving advertisements over mobile devices.

FIG. 3 is a flowchart illustrating steps that may be taken by one of the revenue generators 110A-N in the systems of FIG. 1, and FIG. 2, or other systems for serving advertisements over mobile devices. The steps may occur when one of the revenue generators 110A-N, such as the revenue generator A 110A, wishes to bid on keywords for a carrier, such as the MNO A 115A. At block 310, the revenue generator A 110A interacts with the service provider server 240, such as by logging onto the service provider 130. At block 320, the revenue generator A 110A may communicate a request to bid on mobile keywords.

At block 330, the revenue generator A 110A may communicate information identifying the keyword the revenue generator A 110A wishes to bid on. At block 340, the revenue generator A 110A may identify one or more MNOs 115A-N, such as the MNO A 115A, that the revenue generator A 110A wishes to bid for the keyword on. Once the revenue generator A 110A identifies one or more MNOs 115A-N, the system 100 may move to block 350. At block 350, the revenue generator A 110A may place a bid on the identified keyword for the MNO A 115A. The bid made by the revenue generator A 110A may only apply to the keyword when searched for on the MNO A 115A. The revenue generator A 110A may specify one or more other MNOs 115B-N which the bid may apply to.

At block 360, the revenue generator A 110A may communicate to the service provider 130 a mobile advertisement and a mobile URL to which the advertisement may link. The mobile advertisement may consist of a description of the advertisement and/or a title of the advertisement. The limited space available on the screens of mobile devices may necessitate that a mobile advertisement be relatively shorter than a web advertisement. Alternatively or in addition, the advertisement may include other elements, such as images, audio, and/or video elements (together "creatives"). If the revenue generator A 110A does not have a mobile URL for the MNO A 115A, the service provider 130 may generate a "WAP ad" for the revenue generator A 110A. The "WAP ad" may be a mobile page for the MNO that contains the phone number and/or the logo of the revenue generator A 110A. The "WAP ad" data may be stored in the advertisement description field of the MNO listing of the revenue generator A 110A.

Figure 4:
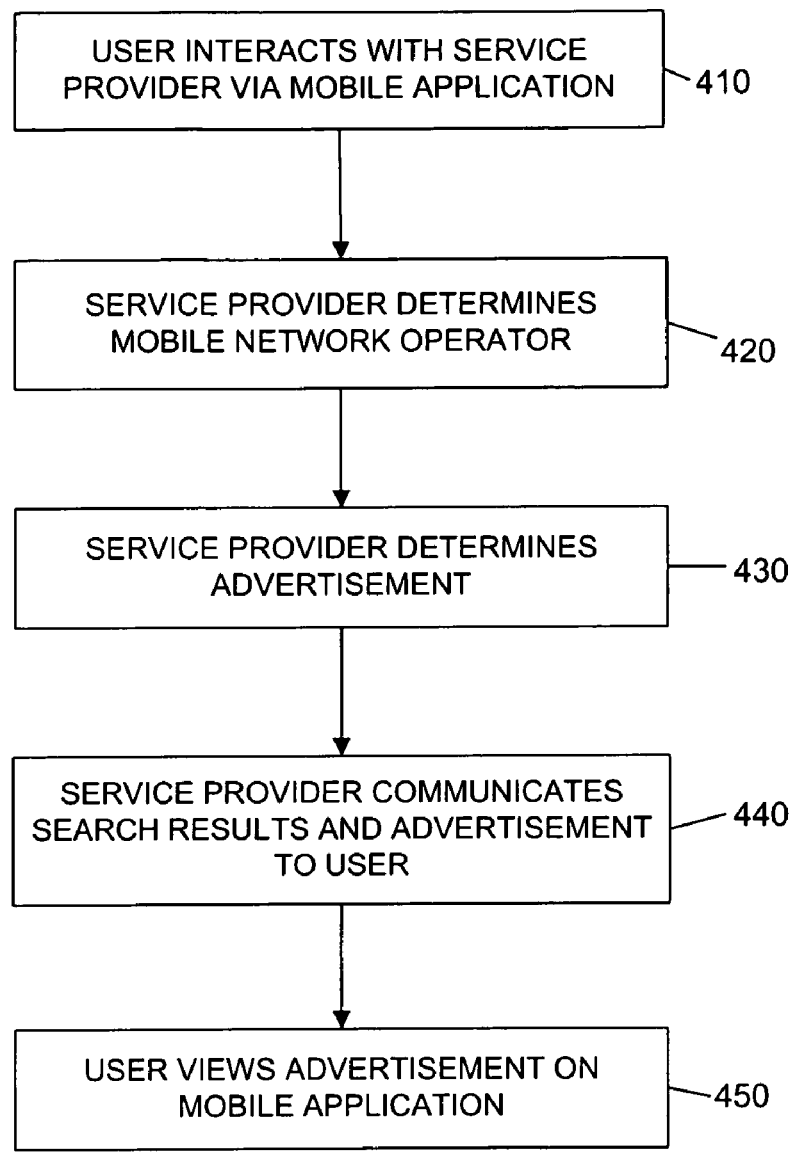
FIG. 4 is a flowchart illustrating steps that may be taken by a user in the systems of FIG. 1 and FIG. 2, or other systems for serving advertisements over mobile devices.

FIG. 4 is a flowchart illustrating steps that may be taken by one of the users 120AA-NN in the systems of FIG. 1, and FIG. 2, or other systems for serving advertisements over mobile devices. The steps may occur when one of the users 120AA-NN, such as the user AA 120AA, performs a search on a mobile application 220AA-NN via a MNO 115A-N, such as the MNO A 115A. At block 410, the user AA 120AA may interact with the service provider 130 via the mobile application AA 220AA, such as by performing a search from the mobile application AA 220AA. At block 420, the service provider 130 may determine the carrier the request of the user AA 120AA originates from, such as the MNO A 115A. At block 430, the service provider 130 may determine which advertisements may relate to the keyword searched for on the MNO A 115A. The service provider 130 may select advertisements from revenue generators 110A-N who may have bid on the keyword searched for from the MNO A 115A. The service provider 130 may select the revenue generator A 110A with the highest bid for the keyword from the MNO A 115A. Alternatively or in addition the service provider 130 may select more than one advertisement to display to the user AA 120AA. The size of the screen on the device of the user AA 120AA may be a factor used in determining how many advertisements to communicate to the user AA 120AA.

At block 440, the service provider 130 may communicate the advertisement and search results to the user AA 120AA via the MNO A 115A and the mobile application AA 220AA. At block 450, the user AA 120AA may view the search results and accompanying advertisement via the mobile application AA 220AA.

FIG. 5 is an illustration of a general computer system 500 that may be used in a system for content filtering advertisements before approval of service of the advertisements through a publisher (or service provider) to a mobile device. The general computer system 500 may represent a service provider server 240, a third party server 250, an advertising services server 260, a mobile device or any of the other computing devices referenced herein. The computer system 500 may include a set of instructions 524 that may be executed to cause the computer system 500 to perform any one or more of the methods or computer based functions disclosed herein. The computer system 500 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 524 (sequential or otherwise) that specify actions to be taken by that machine. In a particular embodiment, the computer system 500 may be implemented using electronic devices that provide voice, video or data communication. Further, while a single computer system 500 may be illustrated, the term "system" shall also be taken to include any collection of systems or subsystems that individually or jointly execute a set, or multiple sets, of instructions to perform one or more computer functions.

As illustrated in FIG. 5, the computer system 500 may include a processor 502, such as, a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via a bus 508. The memory 504 may be a main memory, a static memory, or a dynamic memory. The memory 504 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 504 may include a cache or random access memory for the processor 502. Alternatively or in addition, the memory 504 may be separate from the processor 502, such as a cache memory of a processor, the system memory, or other memory.

The memory 504 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 504 may be operable to store instructions 524 executable by the processor 502. The functions, acts or tasks illustrated in the figures or described herein may be performed by the programmed processor 502 executing the instructions 524 stored in the memory 504. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 500 may further include a display 514, such as a liquid crystal display (LCD), an organic light emitting diode (OLED), a flat panel display, a solid state display, a cathode ray tube (CRT), a projector, a printer or other now known or later developed display device for outputting determined information. The display 514 may act as an interface for the user to see the functioning of the processor 502, or specifically as an interface with the software stored in the memory 504 or in the drive unit 506.

Additionally, the computer system 500 may include an input device 512 configured to allow a user to interact with any of the components of the system 500. The input device 512 may be a number pad, a keyboard, or a cursor control device, such as a mouse, or a joystick, touch screen display, remote control or any other device operative to interact with the system 500.

The computer system 500 may also include a disk or optical drive unit 506. The disk drive unit 506 may include a computer-readable medium 522 in which one or more sets of instructions 524, e.g. software, can be embedded. Further, the instructions 524 may perform one or more of the methods or logic as described herein. The instructions 524 may reside completely, or at least partially, within the memory 504 and/or within the processor 502 during execution by the computer system 500. The memory 504 and the processor 502 also may include computer-readable media as discussed above.

The present disclosure contemplates a computer-readable medium 522 that includes instructions 524 or receives and executes instructions 524 responsive to a propagated signal; so that a device connected to a network 230 or a network 235 may communicate voice, video, audio, images or any other data over the networks 230, 235 (together "network 235"). The instructions 524 may be implemented with hardware, software and/or firmware, or any combination thereof. Further, the instructions 524 may be transmitted or received over the network 235 via a communication interface 518.

The communication interface 518 may be a part of the processor 502 or may be a separate component. The communication interface 518 may be created in software or may be a physical connection in hardware. The communication interface 518 may be configured to connect with a network 235, external media, the display 514, or any other components in the system 500, or combinations thereof. The connection with the network 235 may be a physical connection, such as a wired Ethernet connection or may be established wirelessly as discussed below. Likewise, the additional connections with other components of the system 500 may be physical connections or may be established wirelessly. In the case of a service provider server 240, a third party server 250, or an advertising services server 260, the servers may communicate with users 120A-N and the revenue generators 110A-N through the communication interface 518.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 522 may be a single medium, or the computer-readable medium 522 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 522 may include a solid-state memory such as a memory card or other package that houses one or more non-volatile read-only memories. The computer-readable medium 522 also may be a random access memory or other volatile re-writable memory. Additionally, the computer-readable medium 522 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

Figure 6:
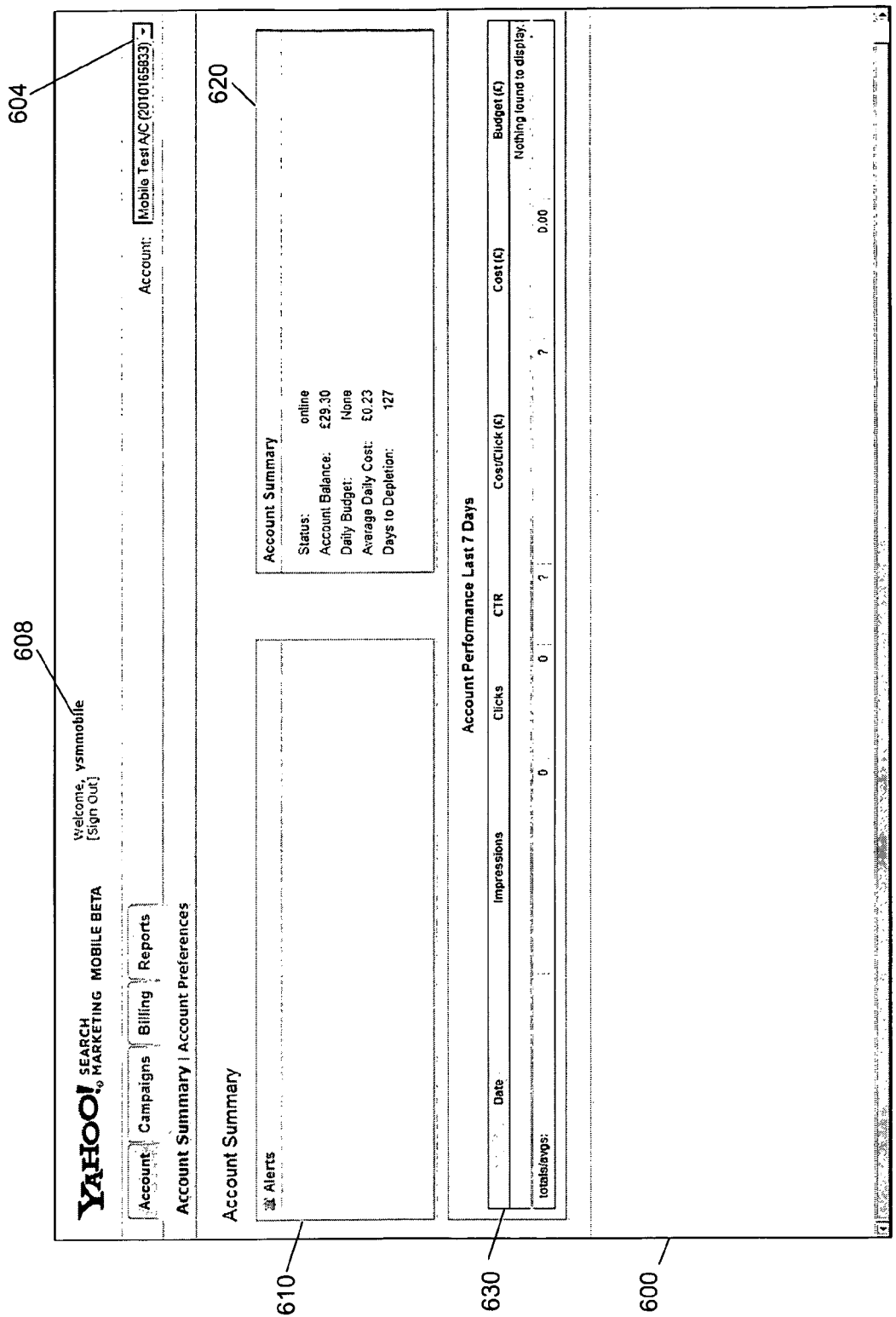
FIG. 6 is a screenshot of a revenue generator's account preferences screen in the systems of FIG. 1 and FIG. 2, or other systems for serving advertisements over mobile devices.

FIG. 6 is a screenshot 600 of an implementation of a revenue generator account preferences view of a revenue generator interface in the systems of FIG. 1 and FIG. 2 or any other system serving advertisements over mobile devices. A revenue generator interface may be displayed to one of the revenue generators 110A-N, such as the revenue generator A 110A, when the revenue generator A 110A interacts with the service provider 130. The account preferences screen may allow the revenue generator A 110A to view or change default settings for the selected account. The screenshot 600 may include an account drop-down box 604, a revenue generator identifier 608, a default bid textbox 610, a mobile site checkbox 620, a default URL textbox 630, a default phone number textbox 640, a logo display 650, a logo textbox 660, a browse button 670 and an update button 680.

The revenue generator A 120A may enter a default bid amount in the default bid textbox 610. The revenue generator A 110A may check the mobile site checkbox 620 if the revenue generator A 110A has a mobile site. If the revenue generator A 110A has a mobile site, the revenue generator A 110A may enter the URL of the mobile site in the default URL textbox 630.

If the revenue generator A 110A does not have a mobile site, the service provider 130 may generate a "WAP ad" for the revenue generator A 110A. The "WAP ad" may include the phone number and logo of the revenue generator A 110A and a short message. The revenue generator A 110A may supply their phone number in the default phone number box 640. The revenue generator A 110A may specify the location of their logo in the logo textbox 660. Alternatively or in addition the revenue generator A 110A may browse for their logo by clicking on the browse button 670. A preview of the logo may be displayed in the logo display 650. The revenue generator A 110A may submit the changes to the service provider 130 by clicking on the update button 680.

Figure 7:
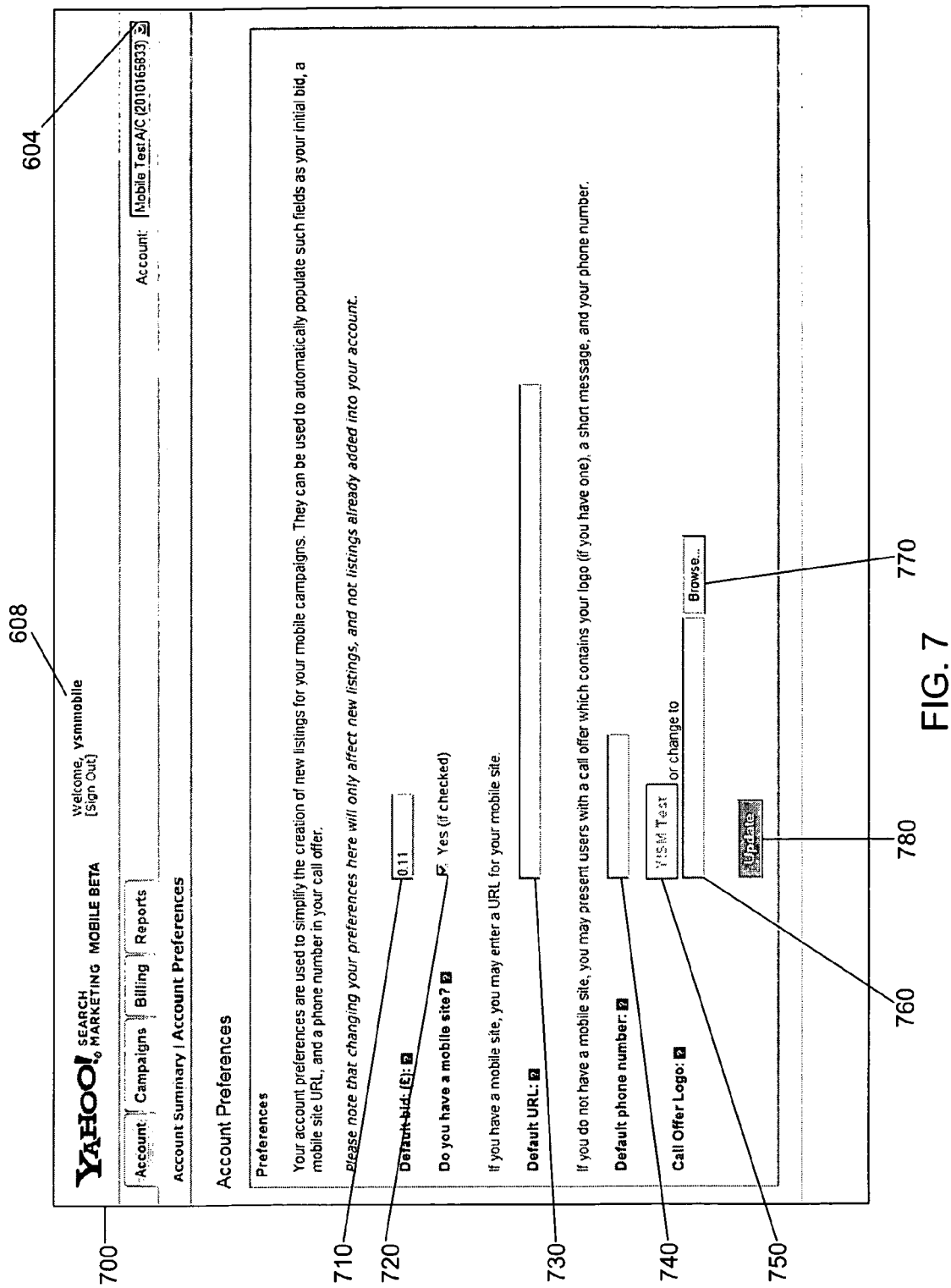
FIG. 7 is a screenshot of a revenue generator's account preferences screen in the systems of FIG. 1 and FIG. 2, or other systems for serving advertisements over mobile devices.

FIG. 7 is a screenshot 700 of an implementation of a revenue generator account preferences view of a revenue generator interface in the systems of FIG. 1, and FIG. 2 or any other system serving advertisements over mobile devices. A revenue generator interface may be displayed to one of the revenue generators 110A-N, such as the revenue generator A 110A, when the revenue generator A 110A interacts with the service provider 130. The account preferences screen may allow the revenue generator A 110A to view or change default settings for the selected account. The screenshot 700 may include an account drop-down box 604, a revenue generator identifier 608, a default bid textbox 710, a mobile site checkbox 720, a default URL textbox 730, a default phone number textbox 740, a logo display 750, a logo textbox 760, a browse button 770 and an update button 780.

The revenue generator A 120A may enter a default bid amount in the default bid textbox 710. The revenue generator A 110A may check the mobile site checkbox 720 if the revenue generator A 110A has a mobile site. If the revenue generator A 110A has a mobile site, the revenue generator A 110A may enter the URL of the mobile site in the default URL textbox 730.

If the revenue generator A 110A does not have a mobile site, the service provider 130 may generate a "WAP ad" for the revenue generator A 110A. The "WAP ad" may include the phone number and logo of the revenue generator A 110A and a short message. The revenue generator A 110A may supply their phone number in the default phone number box 740. The revenue generator A 110A may specify the location of their logo in the logo textbox 960. Alternatively or in addition the revenue generator A 10A may browse for their logo by clicking on the browse button 770. A preview of the logo may be displayed in the logo display 750. The revenue generator A 110A may submit the changes to the service provider 130 by clicking on the update button 780.

Figure 8:
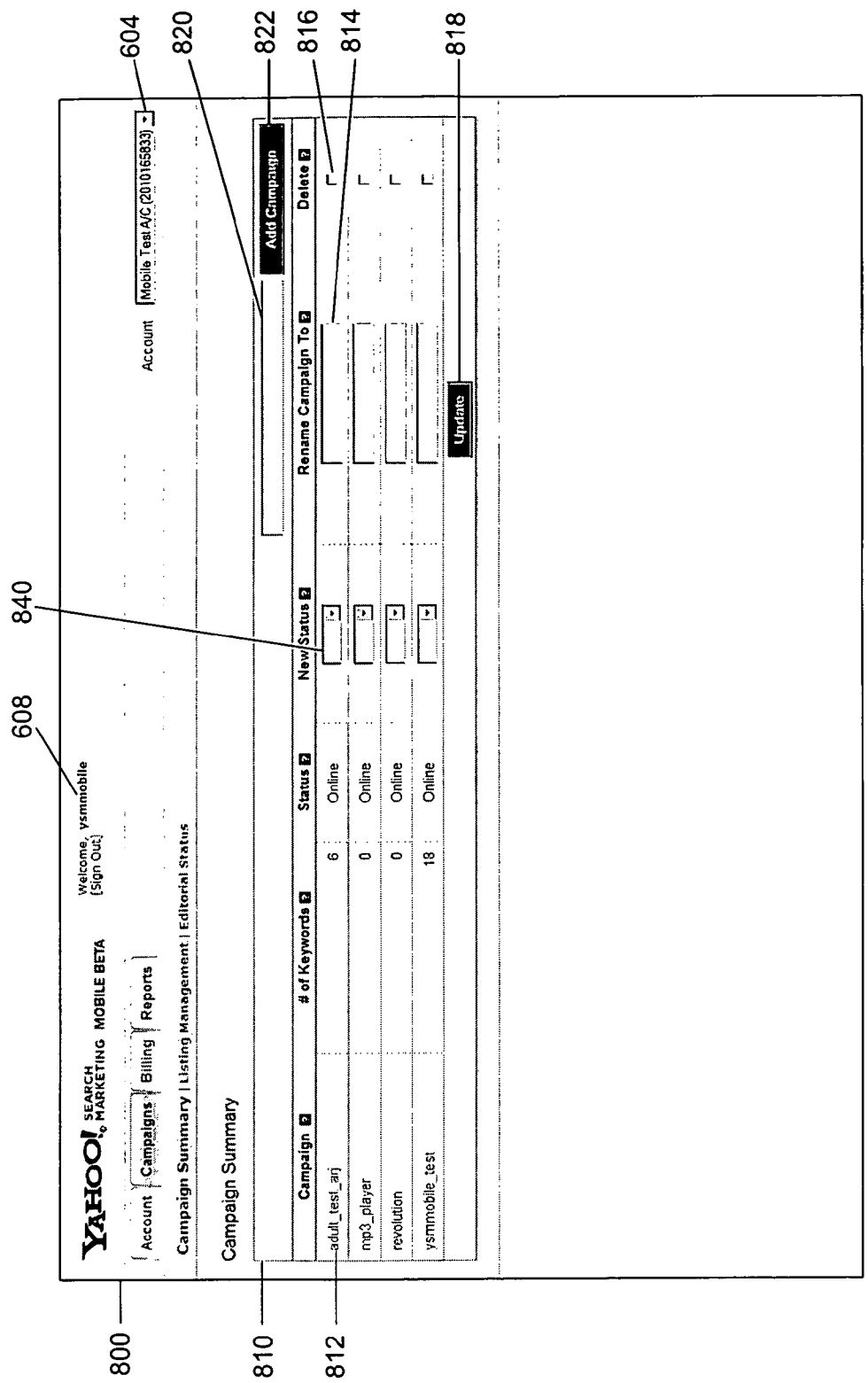
FIG. 8 is a screenshot of a revenue generator's campaign summary screen in the systems of FIG. 1 and FIG. 2, or other systems for serving advertisements over mobile devices.

FIG. 8 is a screenshot 800 of an implementation of a revenue generator campaign summary view of a revenue generator interface in the systems of FIG. 1, and FIG. 2 or any other system serving advertisements over mobile devices. A revenue generator interface may be displayed to one of the revenue generators 110A-N, such as the revenue generator A 110A, when the revenue generator A 110A interacts with the service provider 130. The campaign summary screen may allow the revenue generator A 110A to view the current campaigns, change the status of the campaigns and rename, add or delete campaigns. The screenshot 800 may include a campaign summary table 810, an account drop-down box 604, and a revenue generator identifier 608. The campaign summary table 810 may include an add campaign textbox 820, an add campaign button 822, an update button 818 and one or more rows of data, each representing a campaign of the revenue generator A 110A. Each row of data may include a campaign name link 812, the number of keywords in the campaign, the status of the campaign, a new status drop-down box 840, a rename campaign textbox 814, and a delete checkbox 816.

The campaign name link 812 may display the name of the campaign to the revenue generator A 110A. If the revenue generator A 110A clicks on the campaign name link 812, the revenue generator A 110A may be displayed a listing management screen for the campaign, such as in FIGS. 9 and 10. The new status drop-down box 840 may allow a revenue generator A 110A to change the status of the campaign, such as to offline or online. The revenue generator A 110A may be able to rename the campaign by typing a new name into the rename campaign textbox 814. The revenue generator may be able to delete a campaign by checking the delete textbox 816. The revenue generator A 110A may submit changes to the campaigns by clicking on the update button 818. The revenue generator A 110A may be able to add a campaign by typing a campaign name into the add campaign textbox 820 and then clicking on the add campaign button 822.

Figure 9:
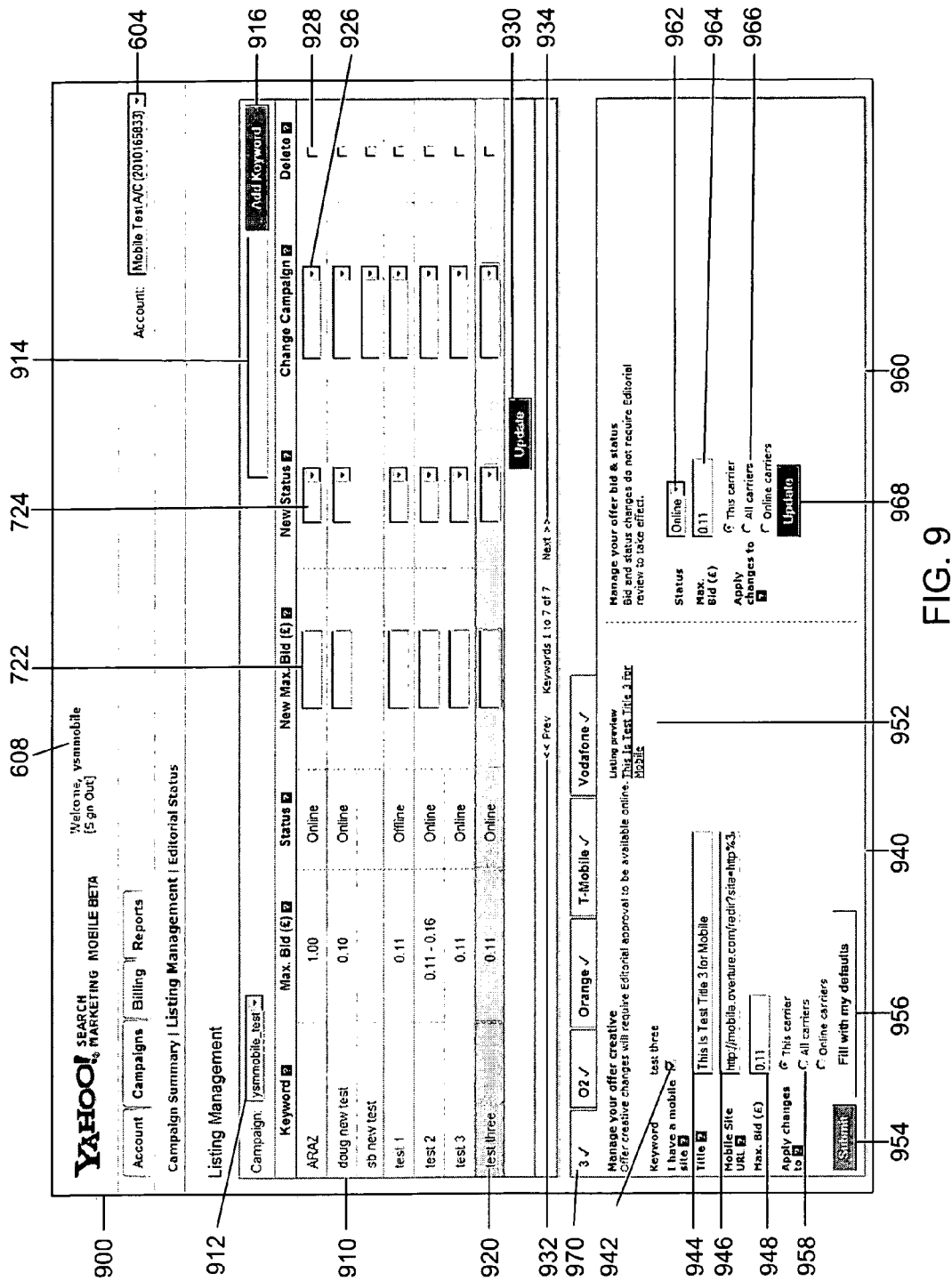
FIG. 9 is a screenshot of a revenue generator's listing management screen showing a mobile site URL entry in the systems of FIG. 1 and FIG. 2, or other systems for serving advertisements over mobile devices.

FIG. 9 is a screenshot 900 of an implementation of a revenue generator listing management view of a revenue generator interface in the systems of FIG. 1 and FIG. 2 or any other system serving advertisements over mobile devices. A revenue generator interface may be displayed to one of the revenue generators 110A-N, such as the revenue generator A 110A, when the revenue generator A 110A interacts with the service provider 130. The listing interface screen may allow the revenue generator A 110A to add/modify/view their listings, and their carrier listings. The screenshot 900 may include a listing summary table 910, a manage creative table 940, a manage offer table 960, an account drop-down box 604, and a revenue generator identifier 608.

The listing summary table 910 may include a campaign drop-down box 912, an add keyword textbox 914, an add keyword button 916, an update listings button 930, a previous listings link 932, a next listings link 934 and one or more rows of keyword data. The rows of keyword data may include a keyword link 920, a maximum bid, a status, a new maximum bid textbox 922, a new status drop-down box 924, a change campaign drop-down box 926, and a delete keyword checkbox 928.

The manage creative table 940 may include carrier tabs 970, a mobile site checkbox 942, a listing title textbox 944, a mobile site URL textbox 946, a maximum bid textbox 948, apply changes radio buttons 958, a listing preview window 952, a submit button 954, and a defaults button 956. The manage offer table 960 may include a status drop-down box 962, a maximum bid textbox 964, an apply changes radio buttons 966, and an update offer button 968.

The listing summary table 910 may display all of the listings of the campaign identified by the campaign drop-down box 912. The campaign drop-down box may allow the revenue generator A 110A to choose one of the campaigns associated with the account identified in the account drop-down box 904. The account drop-down box 604 may include all of the accounts associated with the revenue generator A 110A. The summary listing table 910 may contain a row of data for each listing of the campaign. The data may include the keyword associated with the listing, the maximum bid of the listing, and the status of the listing. The revenue generator A 110A may be able to enter a new maximum bid for the keyword in the new maximum bid textbox 922. The status of the keyword may be modified by changing the new status drop-down box 924. The campaign the listing is associated with may be modified by the change campaign drop-down box 926. The listing may be deleted by clicking on the delete checkbox 928. The revenue generator A 110A may submit the changes by clicking on the update listings button 930. The previous listings link 932 and the next listings link 934, may allow the revenue generator A 110A to view other listings associated with the selected campaign.

The revenue generator A 110A may be able to click on the keyword link 920 to change the data related to the carrier listings of the keyword. When the revenue generator A 110A clicks on a keyword link 920, the manage creative table 940 and the manage offer table 960 may update to reflect the data associated with the keyword link 920 clicked on. The carrier listings data may be modified in the manage creative table 940 and the manage offer table 960. The manage creative table 940 may allow the revenue generator A 110A to modify the advertisement associated with each carrier listing for the keyword. The revenue generator A 110A may be able to view data associated with each of the carrier listings by clicking through the carrier tabs 970.

The manage creative table 940 may display the keyword the revenue generator A 110A is currently viewing. The revenue generator A 110A may identify whether they have a mobile site for the carrier by clicking on the mobile site checkbox 942. If the revenue generator A 110A has a mobile site for the carrier identified by the carrier tabs 970, the revenue generator A 110A may enter the title of the advertisement in the listing title textbox 944. The listing title may be the text of the advertisement that may be displayed to the users 120AA-NN. The revenue generator A 110A may enter the URL of their mobile site for the carrier in the mobile site URL textbox 946. The mobile site URL may be the URL that the users 120AA-NN may be directed to upon clicking on the advertisement of the revenue generator A 110A. The revenue generator A 110A may identify their maximum bid for the keyword on the carrier in the maximum bid textbox 948. The maximum bid may identify the maximum amount the revenue generator A 110A may be willing to pay to have their advertisement displayed to users 120AA-NN of the carrier. The apply changes radio buttons 958 may allow the revenue generator A 110A to specify which carriers the changes may apply to. The revenue generator A 110A may submit the changes by clicking on the submit button 954.

The revenue generator A 110A may click on the defaults button 956 to fill the data fields in the manage creative table 940 with any defaults they identified in the account preferences screenshot 700. A preview of the advertisement may be displayed in the listing preview window 952. If the revenue generator A 110A makes changes to the manage creative table 940, the revenue generator A 110A may need editorial approval. Editorial approval may require a supervisor or account administrator of the service provider 130 to approve of the creative changes to the listing for the given carrier. The editorial approval process may ensure that the advertisement does not contain hate terms, infringe on others' trademarks, or otherwise be inappropriate for displaying to the users 120AA-NN. Alternatively or in addition the editorial approval may be automated and may be performed by the service provider 130.

The manage offer table 960 may allow the revenue generator A 110A to modify a subset of the data associated with the carrier listing that does not require editorial approval. The revenue generator A 110A may change the status of the carrier listing by clicking on the status drop-down box 962. The revenue generator A 110A may modify the bid amount in the maximum bid textbox 964. The revenue generator A 110A may select which carriers the changes may apply to by using the apply changes radio buttons 966. The revenue generator A 110A may update the manage offer table 960 information by clicking on the update offer button 968.

Alternatively or in addition the service provider 130 and/or the revenue generators 110A-N may use middleware to implement a presentation abstraction layer, such as the YAHOO! MOBILE SUSHI platform, to simplify the process of creating campaigns across multiple MNOs 115A-N. SUSHI includes a device database of phone models, mobile browsers, etc., and takes a user agent string, parses out the phone model, carrier, mobile browser, etc., and then looks up the mobile markup language suitable for the device, carrier, and browser. A main application on the mobile device can then format the advertisement, or data, in the mark-up language suitable for the mobile device.

Figure 10:
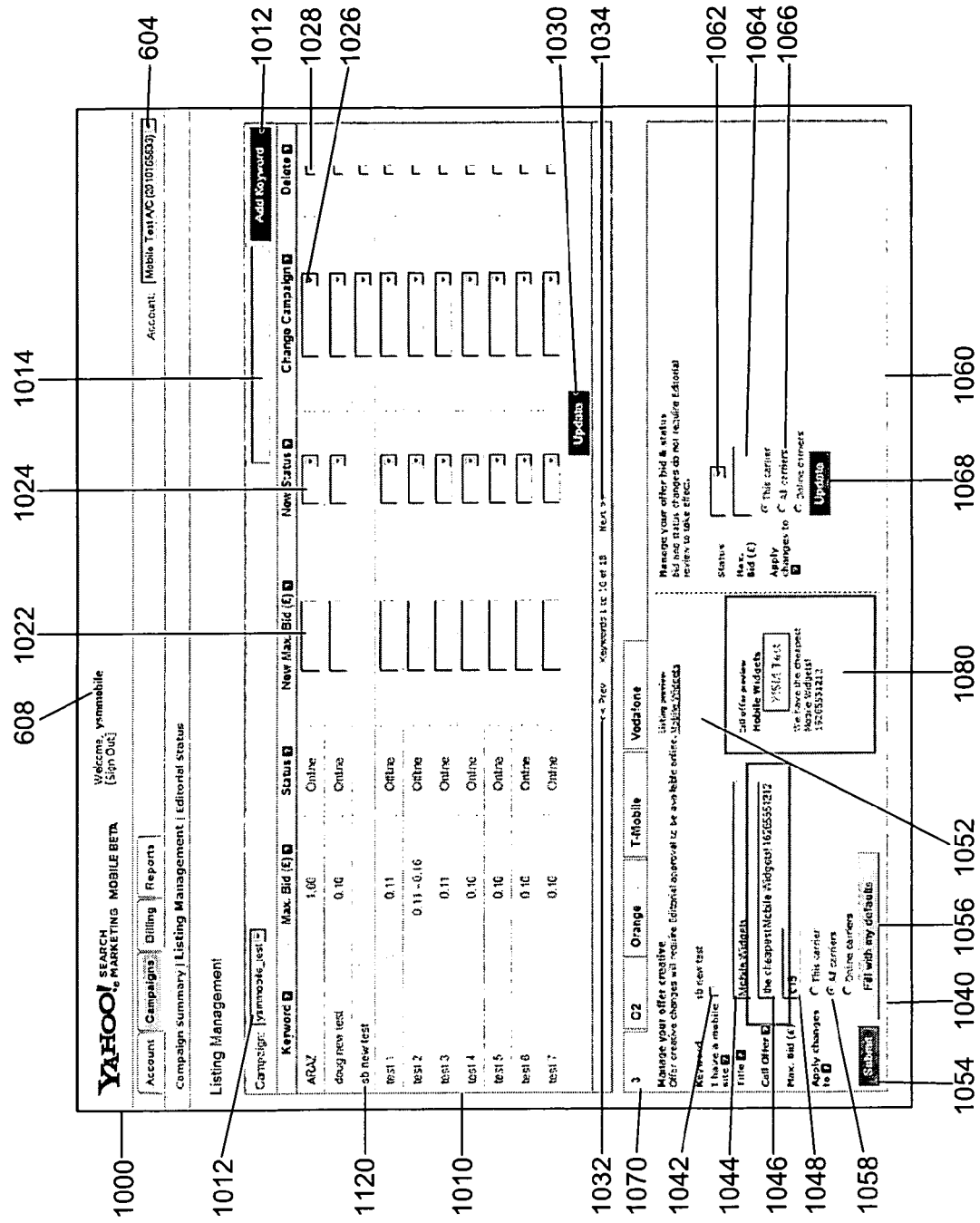
FIG. 10 is a screenshot of a revenue generator's listing management screen showing a call offer entry in the systems of FIG. 1 and FIG. 2, or other systems for serving advertisements over mobile devices.

FIG. 10 is a screenshot 1000 of an implementation of a revenue generator listing management view of a revenue generator interface in the systems of FIG. 1, and FIG. 2 or any other system serving advertisements over mobile devices. The screenshot 1000 demonstrates the implementation of a "WAP ad" for revenue generators 110A-N who may not have mobile sites for a particular carrier. This functionality may be demonstrated in the manage creative table 1040. The remainder of the screenshot 1000 may be similar or the same as the screenshot 900 in FIG. 9. A revenue generator interface may be displayed to one of the revenue generators 110A-N, such as the revenue generator A 110A, when the revenue generator A 110A interacts with the service provider 130.

In the screenshot 1000, the revenue generator A 110A may not have a mobile site for the mobile carrier "3". The revenue generator A 110A may uncheck the mobile site checkbox 1042 to identify that they do not have a mobile site for the mobile carrier. Unchecking the mobile site checkbox 1042 may cause the mobile site URL textbox 946 in FIG. 9 to dynamically change into a call offer textbox 1046. In addition, a call offer preview window 1080 may be added to the manage creative table 940. The revenue generator A 110A may enter the text of the "WAP ad" in the call offer textbox 1046. This text may be displayed to the users 120AA-NN when they click on the associated advertisement. The call offer preview window 1080 may display a preview of the call offer, or "WAP ad". The call offer may also include the logo identified in the call offer logo textbox 760 in FIG. 7.

FIG. 11 is a screenshot 1100 of an implementation of a revenue generator editorial status view of a revenue generator interface in the systems of FIG. 1 and FIG. 2 or any other system serving advertisements over mobile devices. A revenue generator interface may be displayed to one of the revenue generators 110A-N, such as the revenue generator A 110A, when the revenue generator A 110A interacts with the service provider 130. The editorial status screen may allow the revenue generator A 110A to view the editorial status of their listings. The screenshot 1100 may include an editorial status table 1110, a campaign drop-down box 1120, a type drop-down box 1130, a go button 1140, an account drop-down box 604, and a revenue generator identifier 608.

The editorial status table 1110 may display the editorial status of the listings associated with the campaign identified in the campaign status drop-down box 1120. The listing data may be further filtered by selecting a status type of the listing in the type drop-down box 1130, such as "All," "Declined," "Pending," or "Approved." The editorial status table 1110 may include a plurality of columns including a keyword column 1150, a carrier column 1155, a date submitted column 1160, a status column 1165, a status date column 1170, an estimated completion date column 1175, and a column 1180 to detail the reason or reasons for declining or removing an advertisement. The status type in the type drop-down box 1130 may refer to the status displayed in the status column 1165 in the editorial status table 1110.

The keyword column 1150 may include a list of keywords associated with a mobile advertisement listing, thus each row corresponds to a unique keyword for a given carrier. The carrier column 1155 may include various mobile device carriers associated with the keywords. The date submitted column 1160 may be the date on which a mobile advertisement listing may have been submitted for editorial review for a particular carrier. The status column 1165 may include information about whether a keyword may have been approved for use as a keyword for a mobile advertisement listing for a particular carrier. For example, the status column 1165 may indicate that the keyword may have been declined, may be pending review, or that the keyword may have been approved. Information in the status column may correspond to information entered by the editor via an editor user interface (not shown).

The estimated completion column 1175 may provide a date upon which editorial review of a keyword and its listing may be completed. The column giving the reasons for declining a keyword 1180 may provide a more detailed reason of why a keyword may have been rejected. This information may correspond to information provided by the editor via the editor user interface. A keyword term may be rejected, for example, because a keyword may have been a duplicate keyword. In other words, the keyword may have already been associated with a particular mobile advertisement listing for the particular carrier. If this is the case, the advertiser may not want the duplicate term because this may result in an increased fee for a word that adds no value. Another reason for rejecting a term may, for example, be because the mobile advertisement listing uses bad text. It is to be appreciated that there may be numerous reasons for rejecting keywords and the reasons given above are only exemplary. Other reasons relate to filtering out listings based on advertisement content.

The revenue generator A 110A may submit changes to the campaign drop-down box 1120 or the type drop-down box 1130, by clicking on the go button 1140. Clicking on the go button 1140 may refresh the editorial status table 1110 with data filtered by the selected campaign and type.

FIG. 12 is a screenshot of a revenue generator's advertisement creation screen 1200 in the systems of FIG. 1 and FIG. 2, or other systems for creating advertisements destined for mobile devices. For instance, the advertisement creation may be executed on the advertising services (or other ad) server 260. After a bid specification step, advertisers are prompted to create an advertisement that will be served on mobile devices. The ad creation screen 1200 may include a plurality of data input fields to enable an advertiser, or a revenue generator (110A in FIG. 1), to input ad-related information to enable creation of an advertisement. The fields may include, but are not limited to, a standard title and description field 1204, a short title and description field 1208, a phone number field 1212, an e-mail address field 1216, a short message service (SMS) address field 1220, a street address field 1224, a destination uniform resource locator (URL) field 1228, a display URL field 1232, and advertisement name field 1236. The advertisement name field 1236 enables the advertiser to give this particular advertisement a name to be able to track it through reports of performance and billing.

The standard title and description field 1204 enables creation of a longer advertisement having more characters viewable on a mobile device. For instance, the advertisement may be as long as 40 characters or longer and span over two lines or more of display on the mobile device. The short title and description field 1208 is to enable creation of a shorter version of the same advertisement viewable on a mobile device taking up fewer characters, for instance, 20 characters. The phone number, e-mail address, SMS number, and street address fields (1212-1224) are generally required at the ad-level and are optional but nice-to-have at the account-level.

The destination URL field 1228 is to enable the advertiser to input the destination URL, and the display URL field 1232 to enable the advertiser to input the display URL, related to the advertisement being created. There may be a difference between the destination and display URLs. The display URL is the URL that appears below ad text when an advertisement is shown. The display URL is often the same URL as an advertiser's homepage (e.g. www.Example.com). The destination URL, on the other hand, is the specific location within the website where the advertiser would like to take a user that has clicked on the advertisement. The destination URL does not have to match the display URL, but should be in the same domain, e.g., www.example.com/shoes. If a display URL is equivalent to the company name sign, the destination URL is the particular location within the store (e.g. the shoe section) that an advertiser wants users to visit. This allows for directing of the users 120AA-NN to pages within an advertiser's website that are most relevant to the selected advertisement.

Note also that the field lengths (e.g., number of characters or bytes) of the various fields displayed at 1204 through 1236 may vary depending on the mobile carrier and/or the country of operation. As an advertiser fills in the fields of the ad creation screen 1200, an ad preview field 1240 area will be populated to display how the standard sized advertisement and the short sized advertisement will look on an emulator 1242, 1244, respectively. The display URL may not be shown depending on the implementation by the publisher.

If an advertiser does not have his or her own website to which to direct user traffic from an advertisement, that advertiser will still create all the components of the advertisement on the main ad creation screen 1200 except for the destination and display URLs. Instead, the advertiser may click on a microsite link 1246, which will lead the advertiser to a mobile marketing application (FIG. 13) through which the advertiser may create a mobile website. The microsite link 1246 may prompt advertisers to click on it by using the phrase "If you do not have a mobile website, click here to create one." The mobile marketing application may belong to a third party, integration with which is provided through the ad creation screen 1200, or through the advertiser user interface generally as shown in FIGS. 6 through 11. If a link to the mobile marketing application is provided in another page besides the ad creation screen 1200, a browser of the advertiser may be redirected, after creation of a mobile website, to the ad creation screen 1200 to create an advertisement that links to the newly created mobile website. The interface between the mobile marketing application and the advertisement creation system of the service provider 130 is discussed with reference to FIG. 13.

Additionally, through a select carriers field 1250, the advertiser is able to indicate whether the advertisement must be used for all the carriers that they selected for an advertisement group (or "ad group") targeted by the advertising campaign including the advertisement. The advertisers will be able to create multiple advertisements, and will be able to specify whether the advertisements should be optimized for serving. A save button 1260 and a submit button 1264 are provided to enable the advertiser to save the advertisement data throughout the process, and to finally submit the entire advertisement to be created when complete.

After submission of the advertisement to be created, the advertiser is taken to a review screen (not shown) that displays an overview of the ad group created from the select carriers field 1250. The overview may include the advertisement name, the selected mobile carriers, the bids affiliated with the advertisement, a number of keywords, and a number of advertisements related to the ad group. Additionally displayed may include forecast data such as average CPC and estimated searches. Advertisers may be allowed click-to-edit functionality in case they want to change any specifications for their ad group. Once satisfied with the ad group, advertisers will go to a campaign budgeting and scheduling step (not shown) where they can specify a daily and/or monthly budget if they so choose, and specify a schedule, such as a start and an end date, for the campaign.

Finally, the advertisers are allowed to submit or otherwise activate their advertising campaign including all the advertisements related to an ad group. The mobile carrier or service provider 130 may then send an e-mail acknowledgement or the like that the new campaign has been created.

For a service provider 130 to have a thriving sponsored search business, it is important to have a well-developed mobile web ecosystem. One of the major roadblocks in advancing the mobile web advertising market is the poor adoption of a mobile optimized site as a marketing tactic. There is an expectation that third party advertisers or mobile web developers will increasingly adopt a mobile web channel and build web applications optimized for mobile delivery. Such applications, generally referred to herein as mobile marketing applications, enable advertisers to rapidly create simple web pages that are optimized for mobile devices and enable the advertiser to create advertisement listings that link to these mobile web pages (FIG. 12). The service provider 130 may, initially, provide the mobile marketing application and functionality, but may encourage third party mobile developers to likewise create third party mobile marketing applications to interface/integrate with the advertisement creation system.

Figure 13:
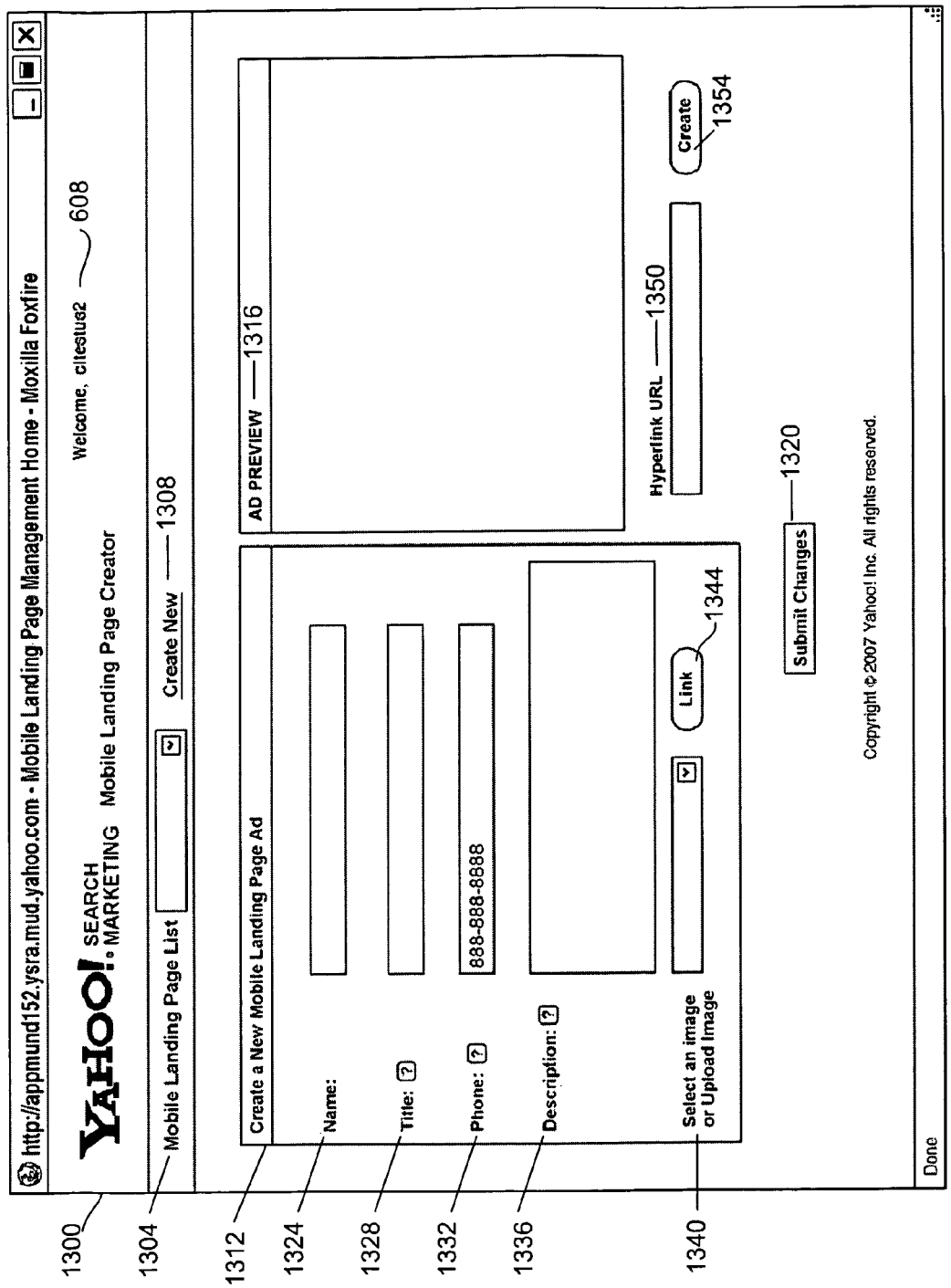
FIG. 13 is a screenshot of an implementation of a mobile website creator view of an advertiser's interface in a mobile marketing application in the systems of FIG. 1 and FIG. 2 or any other system serving advertisements over mobile devices.

FIG. 13 is a screenshot 1300 of an implementation of a mobile website creator view of an advertiser's interface in a mobile marketing application in the systems of FIG. 1 and FIG. 2 or any other system serving advertisements over mobile devices ("mobile service provider system 200"). Mobile applications 210A-N were referred to with reference to FIG. 2 as run by revenue generators 110A-N ("advertisers"), of which the mobile marketing application may be an example. For instance, it may be a third-party advertiser running the application from the advertiser's server or computer. The mobile marketing application may also run on one of the servers of the mobile service provider system 200, such as the service provider server 240 or the third party server 250. The mobile marketing application may then be integrated, perhaps remotely, with the advertising services server 260 or another server (together "ad server") that is designed to enable advertisement creation and to serve those advertisements to pages displayed on mobile devices. For instance, the ad server may enable the advertisement creation process discussed with reference to FIG. 12.

Accordingly, the mobile marketing application may be developed by the service provider 130 or a third party (e.g., 250) to be integrated with an advertiser user interface ("advertiser UI") of the ad server, such as the creation screen 1200. That is, the mobile marketing application can be made to compatibly integrate with the ad server within the service provider system 200. Such integration may ensure that the two pass information between each other once an advertiser is authenticated, and the advertiser is also given simultaneous access to the advertiser interfaces of each. The screenshot 1300 is labeled "mobile landing page creator" because therein displayed is the advertiser interface to the mobile marketing application.

The mobile landing page creator (or advertiser interface) of the mobile marketing application may include the revenue generator identifier 608, a mobile landing page list 1304, a create new option 1308 to create a new mobile website, a mobile website creation screen 1312, an ad preview screen 1316, and a submit changes (or "go live") option 1320. The mobile website creation screen 1312 may further include a name field 1324, a title field 1328, a telephone number field 1332, a description field 1336, and a select or upload image field 1340 and corresponding link button 1344. An advertiser may create a number of mobile websites quickly and easily by accessing the mobile marketing application, selecting the create new option 1308, filling in the mobile website creation screen 1312, and submitting the changes by selecting the go live option 1320.

The advertiser interface may also include a hyperlink field 1350 together with a create button 1354 that enable an advertiser to select either text (including a phone number) or an image, type in a URL or other destination into the hyperlink field 1350, and click on the create button 1354 to hyperlink that text or image to that URL or other destination. The image may also be hyperlinked through selection of the link button 1344, which then prompts the advertiser to select or type in a URL or destination.

The mobile marketing application may be accessed and used by both advertisers who do and do not already have a mobile website. As the mobile marketing application 1300 is used to a greater degree, it will be useful in its more advanced marketing tactics such as e-mail, SMS, etc., and advertisers will leverage such capabilities in addition to hosting their own mobile websites.

Various capabilities (all not necessarily shown in FIG. 13) of the mobile marketing application include, but are not limited to: (1) an advertiser login and integration into the advertiser user interface (UI) such as that displayed in FIGS. 6-12 of the ad server; (2) an ability for the advertiser to specify the contents (text, images, links, phone numbers, etc.) of the mobile site; (3) a mobile site preview; (4) a mobile site hosting; and (5) serving as the foundation for future mobile marketing tactics that the service provider 130 provides to the advertiser.

The mobile marketing application may be made available to a subset of advertisers who already have account access through the ad server to the advertiser UI as displayed in FIGS. 6-12 of the service provider system 200. The subset of advertisers (or revenue generators 110) with access to the mobile marketing application may include an account manager, a campaign manager, but not necessarily analysts who simply are analyzing marketing options, without making account or campaign changes.

An advertiser username and password for access to the user interface (UI) of the mobile website service provider system may also allow access to the mobile marketing application. For instance, when the URL microsite link 1246 is selected from the advertisement creation screen 1200, a browser of the user may be redirected automatically to the mobile marketing application through automatic authentication of the advertiser that has already logged into the advertiser UI of the ad server. Clicking on the URL link 1246 may cause the mobile marketing application to open in a new browser window or tab. This method of authentication uses the same user application server session as currently in use with the ad server of the service provider system 200.

In the alternative or additionally, a login screen may be run when the microsite link 1246 is selected so as to prompt the advertiser to input the same username (or identification) and password as used to gain access to the service provider system 200. While this latter method produces delay in the process of directing the advertiser to the mobile marking application, it still appropriately authenticates the user for access thereto. A security code to prevent spammers may be used if necessary as well.

The mobile marketing application may also be available at its own URL that can be published and communicated to advertisers. The advertisers may not be allowed to sign up directly for the application; sign-up activity may be required to be done through the main ad server advertiser UI.

Once the advertiser has been authenticated for access to the mobile marketing application through one of the above methods, the advertiser may create or modify a mobile website that may then be used to link to mobile advertisements. The screenshot 1300 displays how the mobile marketing application enables an advertiser to input a plurality of content items for display on the mobile website, including a name (1324), a title (1328), a telephone number (1332), a descriptive text (1336), an image (1340), and one of more hyperlinks, created through the hyperlink field 1350 and create button 1354. Accordingly, when created, the mobile website may include an image that is either static or linkable, such that selection of the image may redirect a user to a mobile advertisement or to another page of the mobile website. The term "linkable" refers to creating a hyperlink of one of the content items that actively links to another web page, or to initiate some other function of a mobile device.

The mobile website may include a telephone number, which may also be linkable to initiate a phone call if clicked on by a mobile phone user. Specifically, the advertiser may be allowed to enter a telephone number as part of any descriptive text field (1324, 1328, 1332, or 1336). The advertiser interface, e.g., through the hyperlink and create fields 1350, 1354, of the mobile marketing application may enable the advertiser to highlight and select the phone number and hyperlink it so that when the end-user clicks on the link, it initiates a phone call. The mobile website may also include static text to describe the website or otherwise sell mobile device users on the subject matter of the mobile website. The mobile website may also include a text-based hyperlink that leads to another page on the mobile website. A link to the mobile website homepage may be included or created for inclusion on every page.

Once the desired content is submitted and the layout and style (discussed later) has been arranged, the advertiser may select the "go live" option 1320 that will cause the mobile marketing application to automatically create the mobile website, to include the submitted content items. The mobile marketing application may conduct error checking (discussed later), and automatically publish the mobile website to a network 230 such as the internet through the mobile website service provider system 200.

The mobile marking application may allow an authenticated advertiser to create up to a certain number of pages per mobile website, e.g., a total of 10. Such a threshold value will ensure that mobile websites are not too big for mobile service. Also, each of the pages of the mobile website may be linked to another page using hyperlinks as discussed previously. The application may also allow for a certain threshold number of mobile websites that may be created during a given session. The mobile marking application may allow the advertiser to choose a name (through name field 1324) for each mobile website. This name will be used primarily for identification purposes within the application. The name needs to be unique to the advertiser account, but need not necessarily be unique to other advertiser accounts. If necessary, the name may be used as part of the display URL of the mobile website.

The mobile marketing application may display the URL to the mobile site at the advertiser interface, e.g., through the ad preview screen 1316, that will serve as the destination URL to be used during advertisement creation. The advertiser may then copy this URL from the mobile marketing application and paste it into the destination URL field 1228 in the ad creation screen 1200 of the advertiser UI. The mobile marketing application may then generate a display URL that will be used during the creation of the advertisement, e.g., transmitted or copied/pasted into the display URL field 1232. In generating the display URL, the mobile marketing application may structure the display URL according to one or more of the following criteria: (1) a domain name of the display URL coincides with that of the service provider; (2) a name affiliated with the advertiser is suffixed to the domain name; (3) the mobile website name is included in the display URL; (4) the display URL is valid; and (5) the display URL is unique among a plurality of URLs affiliated with a plurality of advertiser mobile sites of the service provider system.

The mobile marketing application may require that the various content elements submitted for inclusion in the mobile website be laid out in a certain way when the website is created. For instance, if a page of the mobile website is not the homepage, it may create a hyperlink to the homepage at the top and bottom thereof. The layout may then include an image followed by descriptive text, parts or the entirety of which may be hyperlinkable to the advertisement. The link reference may be selectable from one of the previously created mobile pages in a particular mobile website.

Each page created for the mobile website by the mobile marketing application may contain one or more of the following attributes: (1) a name provided to identify the page; (2) a title to be used as a title tag in a markup generated when the page is created, but which need not be displayed on the page; (3) a size limit; (4) a capability to display an image and to make the image linkable; and (5) a capability to display descriptive text and to make the text linkable.

Because the mobile marketing application will allow for the use and display of images on a page, a select or upload image field 1340 is included that allows for the upload of images into the application and that provides for subsequent use. At the time of page creation, the advertiser may be allowed to upload an image that is not over a threshold maximum size in image dimensions. Image upload (1340) may allow for the following, but is not limited to: (1) manual specification of the file path for the image; (2) proviso for a file browser that will allow the advertiser to graphically navigate the file system and find the image file that he or she wishes to upload; and (3) the image dimension restriction is validated prior to completing the upload process and an error message is issued if the dimensions are invalid.

Image names may be globally unique across all mobile sites for a particular advertiser. If the advertiser tries to upload an image with the same name as an existing one, the mobile marketing application may warn the advertiser that an image of the same name exists in the system already and ask if he or she wishes to overwrite the old image with the new one. As part of the image upload function, the mobile marketing application may enable the creation of a hyperlink of this image to a page in the mobile site. As an alternative to the hyperlink field 1350 and create button 1354, a toggle such as the link field 1344 may be displayed that provides an advertiser an option to create a hyperlink of the image. The link reference may be selectable from a list of the pages that have already been created for the mobile site.

The mobile marketing application may offer creative controls to the advertiser to help him or her create a mobile site that conforms to established guidelines that a company may already have. The creative controls may include, but are not limited to the (1) ability to choose from a color palette the background color to apply to the page; (2) ability to choose from a color palette the foreground color, e.g., the text color to apply to the page; and (3) ability to set the font size and font weight, e.g., whether or not bold. The ability to set font size and font weight may be at the individual level, e.g., the title may be bolded but the descriptive text may be in a normal font. Size choices may be limited to small, medium, and large. The mapping to the device capabilities should be done in consultation with information available in the SUSHI device management database, such as discussed previously.

Unlike the regular web which is converging on the use of a single mark-up language, e.g., extensible hypertext markup language (xHTML), devices in the mobile web support a variety of markup standards. Standards such as wireless markup language (WML), compact hypertext markup language (cHTML), and xHTML include some of the markup languages supported by devices. Within these high-level languages, there are various versions in use. For example, both WML 1.x and 2.x are in use currently in the United States. In Japan, in contrast, handhelds on the NTT DoCoMo network primarily use a variant of the cHTML standard.

The markup language generated by the mobile marketing application may take into the account the capabilities of the device (and the device browser) making the request. The device database that is maintained by the SUSHI platform may then be consulted prior to choosing the markup to use in generating the mobile pages. The markup that is most appropriate for the device should be used. Additionally, the device in use may not support the font and/or color specified in the mobile web site. In that case, the most appropriate font and or color may be used. Again, the SUSHI platform may help in deciding the appropriate font and/or color to use for the device making the request.

Figure 14:
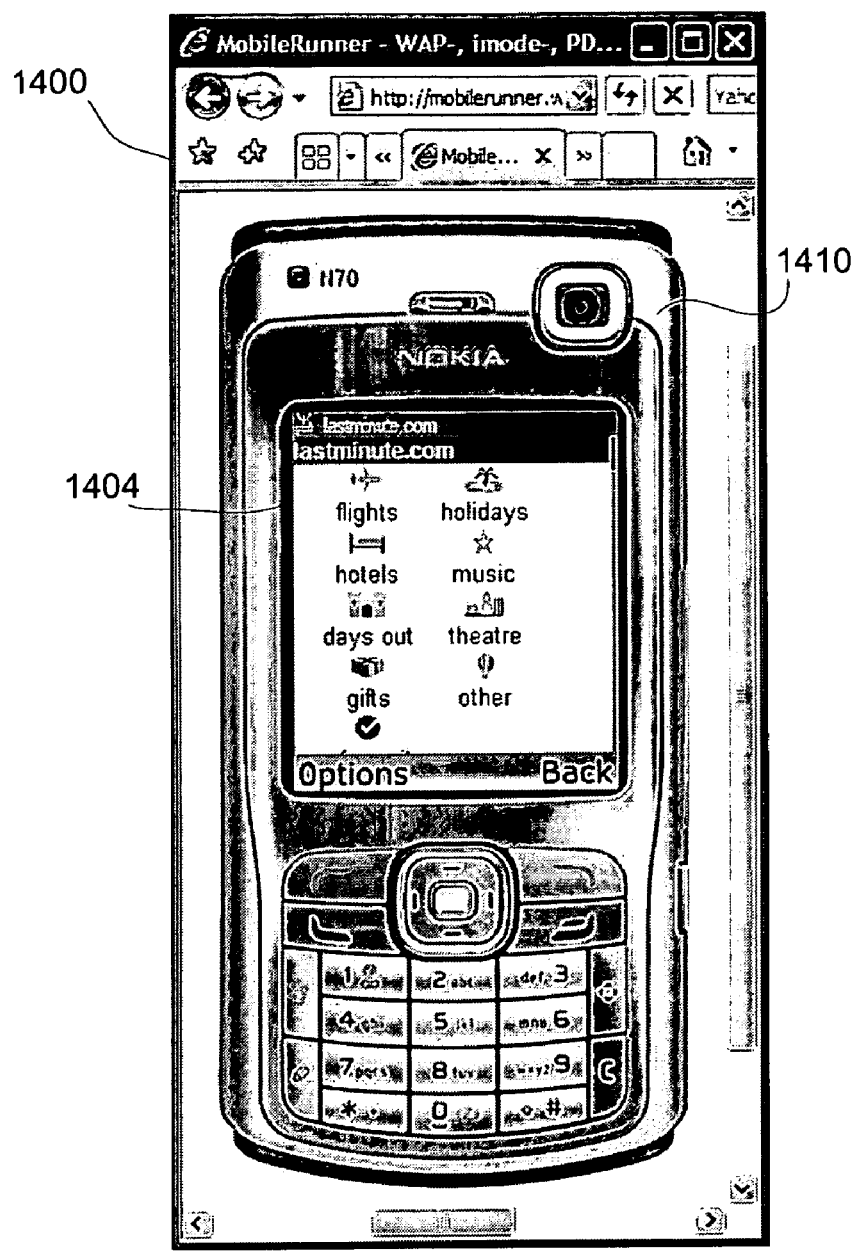
FIG. 14 is a screenshot of an emulator of the mobile marketing application of FIG. 13 that may be displayed to an advertiser to show how the newly created mobile website would look on at least one of the devices to which it is designed for display.

FIG. 14 is a screen shot 1400 of an emulator 1404 of the mobile marketing application that may be displayed to an advertiser to show how the newly created mobile website would look on at least one of the mobile devices to which it is designed for display. The emulator 1404 may be displayed within the ad preview screen 1316 or a subsequent screen or another browser when the go live option 1320 is selected. When a mobile website is created by the mobile marketing application, the latter may display, through the emulator 1404, a form of visual feedback of the design and layout of the mobile landing page. This will improve the advertiser's experience in developing campaigns due to the ability to test the mobile website during or after the creation process. If something is not to the liking of the advertiser that created the mobile site, then it can be modified until it is right.

An approximate rendering of the page as will be seen on a mobile handheld device may be displayed within the emulator 1404. The preview may be wrapped in a "skin" 1410 of a typical mobile phone, for instance. This preview may be as close to the real thing, e.g., an on-device rendering, as possible. It should use the appropriate device markup and take into account the device screen form factor, font, image support, etc. The preview may be "active," e.g., it may act and behave like the real thing. An advertiser may be able to click on links (if any) on the page and be taken to the appropriate URL, for example. In addition, the page may be scrollable in the emulator 1404.

The preview of the emulator 1404 may be configurable by a choice of various mobile phones per market. A set of phones (consisting of the most common ones across all carriers in the target market) will be identified. Skins 1410 may be developed for each of these phones and the preview capability should take into account the individual phone's rendering capabilities and form factors and display a page that comes as close as possible to the real thing.

The mobile marketing application may be in one of two statuses during development: "in development" and "live." All mobile websites start their lives "in development." The mobile marketing application, as discussed above provides the go live option 1320 to promote the website to "live" status. A live site is accessible on the internet at the specified destination URL. A live site is a snapshot of the "in development" version at the time of the status promotion. In other words, any subsequent updates to the site do not affect the live version until the modifications go live.

Modifications may be allowed at any time even if the site is already live. For sites that are live, prior to modifications to the site, the user may be informed that the specific site subject to modification is already live and that changes to the live site will take place only when the go live 1320 option is chosen. Selection of the go live option 1320 with websites that are new or modified may trigger the mobile marketing application to subject the mobile website to a set of error checks. If the website is error free, the website is promoted to a live status and will be accessible through the network 230 on the internet at the specified destination URL.

The following non-exhaustive list of error checks may be performed prior to promoting a site to live status: (1) ensure the site has a page marked as a "home" page; (2) ensure all the links on every page of the site are valid and refer only to pages within the site; (3) ensure all images referenced in the pages exist in the system; (4) validate the text in the pages for correct spelling and grammar; and (5) ensure all pages, fields, and images comply with any size limits in place.

From an editorial perspective, mobile websites created using the mobile marketing application may be treated like any other mobile site that may be created by the advertiser themselves. The implication is that the mobile website may be subjected to the normal site editorial policies (such as discussed with reference to FIG. 11) prior to approval of a mobile advertisement that utilizes a mobile site created using the mobile marketing application. There is no need to review the contents of the mobile website prior to its use in an advertisement. Sites that are reviewed as part of the ad approval process may be subject to modifications post ad-approval. In this case, normal site approval policies used elsewhere (e.g., in web sponsored search) apply.

Existing call offers in a Mobile Resource Center (MRC) of the mobile service provider system may be migrated into the mobile marketing application. To do so, the following steps may be carried out, not necessarily in this order. The call offer landing page is structured as a new single page mobile website. Images are moved over to the mobile marketing application. Attendant image URLs are appropriately updated in the landing page. The "title" field in the MRC may not map to the title field 1328 in the mobile marketing application. They serve different purposes. The title field 1328 in the mobile marketing application may serve as the html page title, e.g., the title that is displayed at the top of the browser.

The migrated landing page may be structured as follows. If a logo was available, then it may be located at the top of the page. The first paragraph of the descriptive text may be the title field from the MRC. The second paragraph of the descriptive text may be the "Offer Text" field from the MRC implementation.

The account level default image logo and phone number may have no corresponding equivalents in the mobile marketing application. The image logo may be included directly onto the landing page that is being migrated. The destination URL of the advertisement must be mapped to the new URL that is generated by the mobile marketing application. The destination URL should be compatible with the click URL shortening solution that is being implemented.

Another aspect of the mobile service provider system is that it may enable third-party providers to create applications that integrate just like the mobile marketing application into the service provider system and advertiser UI. Accordingly, such third-party mobile marketing applications (3PMMA) may enable advertisers to create mobile sites just like the mobile marketing application. Such third-party applications, however, may include different capabilities and tools, support or availability of different logos or images, and/or availability of advertising content that may streamline creation of mobile websites in certain industries, for instance. With this support, great strides may be made toward establishing a mobile advertising ecosystem, which will naturally result in establishment of an advertising network that will grow e-commerce into the mobile realm.

To enable third-parties to create 3PMMAs, the following are requirements that may be required for proper integration: (1) ability to link the entry page of the 3PMMA to the ad (or web) server that provides sponsored search capabilities; (2) ability for the advertiser to seamlessly login to the 3PMMA using the same credentials as used to login to advertiser UI of the ad server of the service provider system 200; (3) ability to transmit carrier selection data from the advertiser UI to the 3PMMA; (4) ability to reference mobile websites created in the 3PMMA from within the advertiser UI of the ad server; (5) ability to reference a destination URL for the mobile site in the ad creation (FIG. 12) through the advertiser UI; (6) ability to transmit advertiser data such as current activity status, whether campaigns are active, statistics related to user-response in click-through rates, etc., to the 3PMMA; and (7) ability to levy a site creation premium that is then shared with the third party.

Additional features may be supported through the 3PMMAs, including an e-mail opt-in and short message service (SMS) text offers. If a consumer expresses interest in a product or service being marketed by an advertiser, the advertiser may use the e-mail (or SMS) channel to push additional information or offers (such as coupons) to the consumer. Because e-mail channels may be used, the information may arrive to the consumer through a mobile or non-mobile means. The end result will still be an ability to further directly market to interested consumers.

To implement the e-mail opt-in feature, 3PMMAs may be required to support the ability for users to opt-in to receive e-mails from the advertiser and the ability for the advertiser to create and manage the actual e-mail. The consumer will also need to be able to opt-out of future e-mails, and in accordance with current laws. Similar support will have to be created in a 3PMMA to provide for SMS text offers to consumers.

Figure 15:
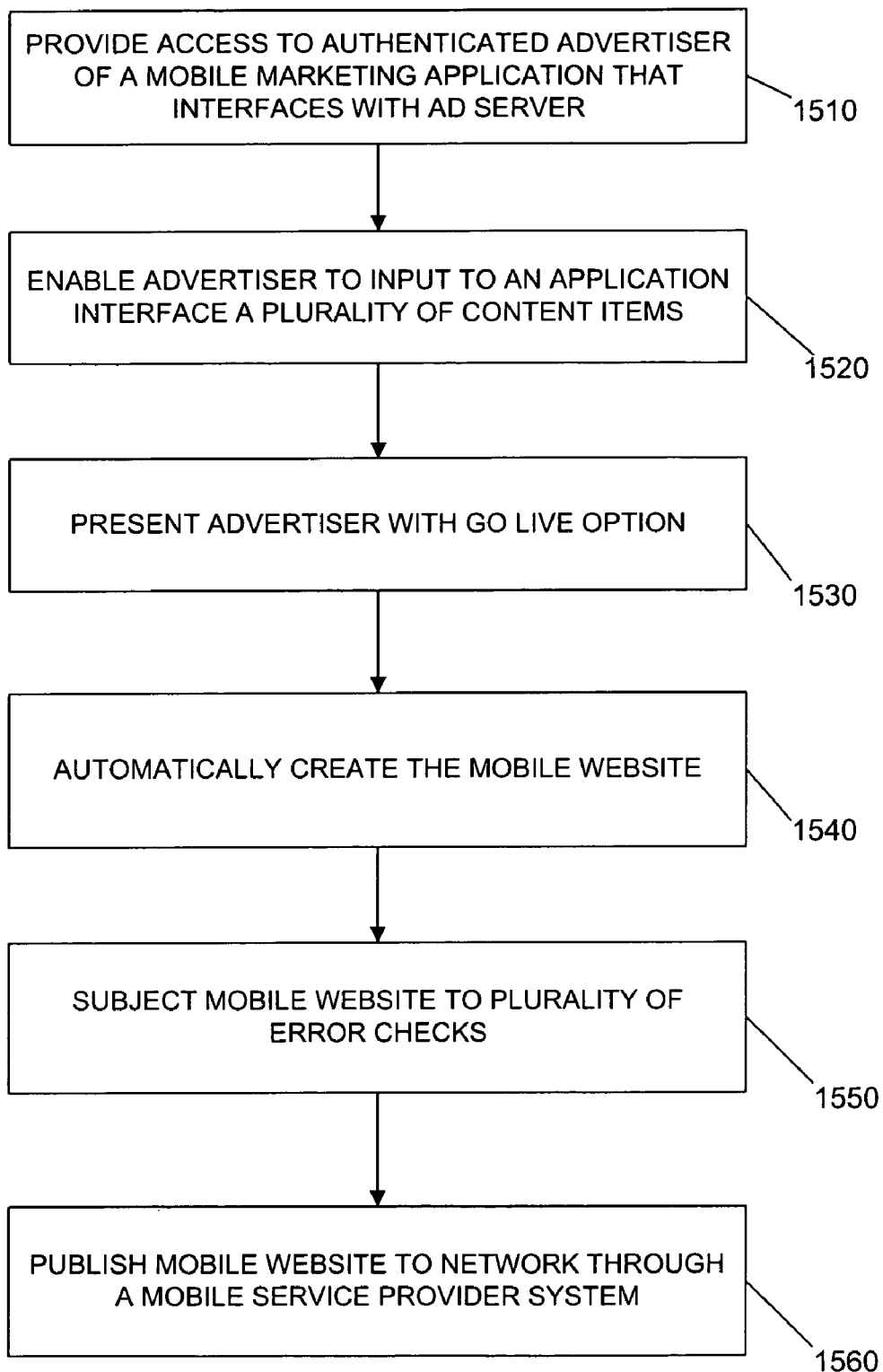
FIG. 15 is a flowchart of a method for rapid creation of mobile websites through a mobile marketing application that interfaces with an ad server.

FIG. 15 is a flowchart of a method for rapid creation of mobile websites through a mobile marketing application that interfaces with an ad server. At block 1510, an advertiser is provided access to a mobile marketing application that interfaces with an ad server, wherein the advertiser is authenticated for access to the ad server. At block 1520, the advertiser is enabled to input to an interface of the application a plurality of content items including one or more of a descriptive text, an image, a phone number, and a hyperlink. At block 1530, the advertiser is presented with a go live option. At block 1540, the mobile website is automatically created to include the submitted content items when the go live option is selected, wherein the application facilitates rapid creation by the advertiser of a mobile website having a plurality of web pages, and the mobile website is optimized for mobile delivery. At block 1550, the created mobile website is subjected to a plurality of error checks. At block 1560, the mobile website is published to a network through a mobile service provider system 200.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method of facilitating quick mobile website creation by mobile advertisers, the method executable by a computer having at least one processor and memory, the method comprising:
    providing to an advertiser, using the computer, access to a mobile marketing application that interfaces with an ad server and is executable by the at least one processor;
    authenticating the advertiser, using the at least one processor, for access to the application through an advertisement creation screen of the ad server with which the advertiser is already authenticated and from which the advertiser links to arrive at the application;
    receiving from the advertiser, through an interface of the application, a plurality of content items selected from a group consisting of a descriptive text, an image, a phone number, and a hyperlink;
    presenting the advertiser with a go live option through the interface;
    receiving a selection of the go live option through the interface;
    creating, using the at least one processor, the mobile website to include the received content items in response to selection of the go live option, wherein the application facilitates rapid creation by the advertiser of a mobile website having a plurality of web pages, and the mobile website is optimized for mobile delivery;
    subjecting, using the at least one processor, the created mobile website to a plurality of error checks; and
    publishing the mobile website, using the at least one processor, to a network through a mobile service provider system.

2. The method of claim 1, wherein the hyperlink provides a connection to another Web page within the mobile website.

3. The method of claim 1, further comprising the at least one processor:
    receiving modifications to the mobile website from the advertiser through the interface of the application; and
    publishing the mobile website with the modifications upon detection of selection of the go live option through the interface.

4. The method of claim 1, further comprising:
    prompting the advertiser with a login screen; and
    authenticating the advertiser for access to the application in response to an advertiser-matched input of a user identification and a password.

5. The method of claim 1, further comprising the at least one processor:
    providing an application access option accessible through the advertisement creation screen of the ad server; and
    authenticating the advertiser for access to the application when the application access option is selected.

6. The method of claim 1, wherein each page of the created mobile website comprises one or more of:
    a name provided to identify the page;
    a title to be used as a title tag in a markup generated when the page is created;
    a size limit;
    a capability to display an image and to make the image linkable; and
    a capability to display descriptive text and to make the text linkable.

7. The method of claim 6, further comprising the at least one processor:
    creating a destination uniform resource locator (URL) to be for affiliation with the created mobile website; and
    displaying the destination URL to the advertiser.

8. The method of claim 7, further comprising:
    generating a display URL based on the destination URL according to one or more of the following criteria:
        a domain name of the display URL coincides with that of the service provider;
        a name affiliated with the advertiser is suffixed to the domain name;
        the mobile website name is included in the display URL;
        the display URL is valid; and
        the display URL is unique among a plurality of URLs affiliated with a plurality of advertiser mobile sites of the service provider system; and
    displaying the display URL to the advertiser.

9. The method of claim 8, further comprising:
    enabling the advertiser to copy and paste the destination and display URLs into a user interface (UI) of the ad server used to create an advertisement that links to the mobile website.

10. The method of claim 6, wherein each web page of the mobile website is laid out such that a link leading back to a home page of the mobile website is presented at the top and bottom thereof and in between which is located the image and the descriptive text.

11. The method of claim 1, wherein a phone number is received as part of the descriptive text, the method further comprising:
   enabling the advertiser to select and hyperlink the phone number so that, when a mobile device user clicks on the phone hyperlink, the mobile device initiates a phone call to that phone number.

12. The method of claim 1, wherein creating the mobile website includes generating a markup that can lookup in a database a device characteristic, and deliver content to a mobile device comprising a version of the mobile website that is compatible with the device characteristic.

13. The method of claim 12, wherein the device characteristic comprises one or more of: a screen size, a font, a color, and another screen attribute, the method further comprising:
   displaying a mobile website page preview to the advertiser before receiving a selection of the go live option, wherein the page preview includes an emulation of the mobile website as displayed on the mobile device.

14. The system of claim 1, further comprising:
   creating multiple mobile websites for the advertiser within a given session of the advertiser accessing the application.

15. A method of integrating third party applications for rapid mobile website creation by mobile advertisers, the method executable by a computer having at least one processor and memory, the method comprising:
   providing, using the computer, a mobile marketing application from a third party provider different than a mobile service provider;
   integrating, using the at least one processor, an advertiser interface of the mobile marketing application with a user interface (UI) of an ad server of the mobile service provider;
   receiving, using the at least one processor, a same set of login credentials as used for access to the ad server from an advertiser through the UI of the ad server;
   authenticating, using the at least one processor, the advertiser with the login credentials for access to the advertiser interface of the mobile marketing application;
   receiving from the advertiser, through the advertiser interface of the mobile marketing application, a plurality of content items to create a mobile website that displays the content items and that is optimized for mobile delivery;
   creating, using the at least one processor, the mobile website with the plurality of content items; and
   creating, using the at least one processor, an advertisement from the UI of the ad server that links to the mobile website created by the mobile marketing application.

16. The method of claim 15, further comprising:
   creating a destination uniform resource locator (URL) to be affiliated with the created mobile website;
   generating a display URL based on the destination URL according to one or more of the following criteria:
      a domain name of the display URL coincides with that of the service provider;
      a name affiliated with the advertiser is suffixed to the domain name;
      the mobile website name is included in the display URL;
      the display URL is valid; and
      the display URL is unique among a plurality of URLs affiliated with a plurality of advertiser mobile sites of the service provider system; and
   transmitting the destination and display URLs to the ad server to create the advertisement that links to mobile website.

17. A system for facilitating quick mobile website creation by mobile advertisers, the system comprising:
   a memory to store instructions of a mobile marketing application, a mobile website data, and a mobile carrier data;
   an interface operatively connected to the memory to communicate with advertisers that use a mobile device or a web-based computer; and
   a processor operatively connected to the memory and the interface and configured to execute the instructions to integrate the interface with an advertiser user interface (UI) of an ad server;
   the processor further configured to:
      provide to an advertiser access to a mobile marketing application that interfaces with the ad server;
      authenticate the advertiser for access to the application through an advertisement creation screen of the UI with which the advertiser is already authenticated and from which the advertiser links to arrive at the application;
      receive from the advertiser, through the interface, a plurality of content items selected from a group consisting of a descriptive text, an image, a phone number, and a hyperlink;
      present the advertiser with a go live option through the interface;
      receive a selection of the go live option through the interface;
      create the mobile website to include the received content items in response to selection of the go live option, wherein the application facilitates rapid creation by the advertiser of a mobile website having a plurality of web pages, and the mobile website is optimized for mobile delivery;
      subject the created mobile website to a plurality of error checks; and
      publish the mobile website to a network through a mobile service provider system.

18. The system of claim 17, wherein the mobile marketing application comprises a third party application designed according to a plurality of criteria that enables third-party integration of the interface with the ad server and with the advertiser UI.

19. The system of claim 17, wherein the processor is further configured to:
   transmit carrier selection data from the advertiser UI to the interface.

20. The system of claim 17, wherein the processor is further configured to:
   authenticate an advertiser through receipt of a selection by the advertiser of a link provided through the advertiser UI or through a separate login screen that prompts the advertiser for a username and password.

21. The system of claim 17, wherein the processor is further configured to:
   enable modification of the mobile website through the interface.

22. The system of claim 17, further comprising:
   a device database to store a plurality of device characteristics of one or more mobile devices;
   wherein, upon creation of the mobile website, the processor generates a markup that can lookup a device characteristic in the device database, and deliver content to a mobile device including a version of the mobile website that is compatible with the device characteristic.

23. The system of claim 22, wherein the device characteristic comprises one or more of: a screen size, a font, a color, and another screen attribute, wherein the processor is further configured to:
- display a mobile website page preview to the advertiser before selection of the go live option, wherein the page preview includes an emulation of the mobile website as displayed on the mobile device.

24. The system of claim 17, wherein the created mobile website comprises a plurality of pages each comprising one or more of:
- a name provided to identify the page;
- a title to be used as a title tag in a markup generated when the page is created;
- a size limit;
- a capability to display an image and to make the image linkable; and
- a capability to display descriptive text and to make the text linkable;
- wherein each web page of the mobile website is laid out such that a link leading back to a home page of the mobile website is presented at the top and bottom thereof and in between which is located the image and the descriptive text.

25. The system of claim 17, where the processor is further configured to:
- create a destination uniform resource locator (URL) to be affiliated with the mobile website;
- generate a display URL based on the destination URL; and
- transmit the destination and display URLs to the ad server to enable creation of a mobile advertisement that operably links to the mobile website.

26. The system of claim 25, wherein the processor is further configured to:
- receive advertisement data from a mobile service provider system including current activity status, whether a campaign is active, or statistics related to user response to the mobile advertisement.

* * * * *